United States Patent [19] [11] 4,268,913

Nakagiri et al. [45] May 19, 1981

[54] ELECTRONIC CALCULATOR WATCH

[75] Inventors: Tadahiko Nakagiri, Higashimurayama; Kunihiro Daigo, Higashiyamato; Toshiaki Oguchi, Kodaira; Minoru Natori, Tokyo; Toshikazu Hatuse; Toshikazu Shimazaki, both of Tanashi; Kouhei Kawanobe, Kawagoe; Hiroshi Ogawa, Tokorozawa; Yoshinobu Kashima, Tanashi; Singo Ichikawa, Sayama; Ryo Namiki, Tokyo; Hisao Yamagata, Tokorozawa, all of Japan

[73] Assignee: Citizen Watch Co., Ltd., Tokyo, Japan

[21] Appl. No.: 796,566

[22] Filed: May 13, 1977

[30] Foreign Application Priority Data

| | | | |
|---|---|---|---|
| May 18, 1976 | [JP] | Japan | 51-62809[U] |
| May 18, 1976 | [JP] | Japan | 51-62810[U] |
| May 24, 1976 | [JP] | Japan | 51-66363[U] |
| May 25, 1976 | [JP] | Japan | 51-59628 |
| Jun. 2, 1976 | [JP] | Japan | 51-63546 |
| Jun. 8, 1976 | [JP] | Japan | 51-749937[U] |
| Jun. 8, 1976 | [JP] | Japan | 51-67297 |
| Jun. 8, 1976 | [JP] | Japan | 51-67298 |
| Jun. 9, 1976 | [JP] | Japan | 51-66450 |
| Jun. 14, 1976 | [JP] | Japan | 51-69450 |
| Jul. 9, 1976 | [JP] | Japan | 51-80963 |
| Jul. 19, 1976 | [JP] | Japan | 51-85725 |
| Jul. 19, 1976 | [JP] | Japan | 51-85726 |
| Jul. 19, 1976 | [JP] | Japan | 51-85727 |
| Jul. 19, 1976 | [JP] | Japan | 51-95810[U] |
| Apr. 8, 1977 | [JP] | Japan | 52-40819 |

[51] Int. Cl.[3] .................... G04B 47/00; G04C 19/00; G04B 29/00; G06F 1/00

[52] U.S. Cl. .................... 368/10; 368/84; 368/87; 368/320; 364/705

[58] Field of Search ................ 58/23 R, 23 BA, 50 R, 58/85.5, 39.5, 152 R, 126 R, 127 R; 200/5 B, 5 E, 5 EA, 5 EB, 5 DC; 340/324 R, 336, 365 R; 364/705; 235/92 T; 350/345

[56] References Cited

U.S. PATENT DOCUMENTS

| | | | |
|---|---|---|---|
| 3,249,705 | 5/1966 | Amis et al. | 200/5 E |
| 3,739,200 | 6/1973 | D'Agostino | 307/304 |
| 3,813,533 | 5/1974 | Cone et al. | 58/152 R X |
| 3,863,436 | 2/1975 | Schwartzschild et al. | 58/50 R |
| 3,928,960 | 12/1975 | Reese | 58/152 R |
| 3,974,351 | 8/1976 | Solov et al. | 58/23 R X |
| 4,003,198 | 1/1977 | Morokawa | 58/152 R |
| 4,022,014 | 5/1977 | Lowdenslager | 58/23 R |
| 4,026,101 | 5/1977 | Moyer | 58/50 R |
| 4,033,110 | 7/1977 | Sagarino | 58/88 R |
| 4,055,755 | 10/1977 | Naramura et al. | 364/705 |
| 4,062,181 | 12/1977 | Zurcher | 58/152 R |
| 4,072,004 | 2/1978 | Tanaka et al. | 58/23 R |
| 4,089,159 | 5/1978 | Yoshida | 58/152 R |
| 4,110,967 | 9/1978 | Fujita | 58/23 R |

*Primary Examiner*—Vit W. Miska
*Attorney, Agent, or Firm*—Jordan and Hamburg

[57] ABSTRACT

An electronic calculator watch which comprises timekeeping means composed of an oscillator, a frequency divider connected to the oscillator, a counter circuit connected to the frequency divider, and a driver circuit connected to the counter circuit for providing an output signal indicative of time information, and calculating means composed of an oscillator circuit and a calculation circuit responsive to perform calculations under control of numerical inputs furnished by external operation device provided on a watch case. The watch also comprises a display including a first display section connected to the driver circuit of the timekeeping means to display the output signal delivered therefrom, and a second display section connected to the calculating means to display the result of calculations, each of the first and second display sections having a plurality of digit electrodes and a plurality of segment electrodes arranged in a matrix configuration.

39 Claims, 37 Drawing Figures

ELECTRONIC CALCULATOR WATCH

This invention relates to a wristwatch equipped with an electronic calculator.

In recent years, much progress has been made in the development of wristwatches which display time in a digital manner through the utilization of electro-optical display devices such as liquid crystals, LEDs, or electrochromic substances. In addition, the growth of IC technology has made it possible to realize extremely slender, multifunction wristwatches which have a sufficiently long battery life. For example, digital wristwatches of the crystal controlled oscillator type utilizing liquid crystal display elements have already been developed and normally can be expected to operate for two years on a single battery. Progress in the field of ICs has also promoted the development of electronic calculators and they too have been greatly reduced in size, furnished with a number of functions and have come to make use of such low power display devices as liquid crystals.

In an electronic wristwatch equipped with a timekeeping system and a calculator system, the timekeeping section which makes use of liquid crystal display elements can be driven with low voltage and power requirements. However, the stability of calculation circuits and the speed required for calculations in the calculator section demand a higher voltage and necessitate a greater consumption of power than the timekeeping section. This has called for the installation of booster circuits.

The arrangement of boosters, their wiring and the addition of a calculator system to the ordinary timekeeping system has led to a great increase in the number of lead patterns to be printed on circuit boards, these leads originating from the IC chips connected to a keyboard or an external operation device and display device. It is extremely difficult to provide these lead patterns especially in view of the small size of a wristwatch.

When a wristwatch is provided with a calculation function, a large number of keys for calculation purposes must be installed in addition to the push-button switches which are used to operate the timekeeping section of the watch. These keys and switches must be arranged within a narrow space which is limited by the size of the timepiece and thus it follows that the spacing between the switches is extremely small. When the push-button switches are to be depressed by a finger, it is quite easy to accidentally depress a neighboring button at the same time and thus operate the wristwatch in an erroneous fashion. In addition, a method of discriminating between keys at a glance is desirable.

Further, push-button devices for use in wristwatches must possess a restoring force in order for the push-buttons to return to their original position after being depressed, and these devices must also be water-proof to prevent the invasion of water during operation. Conventionally, water-proofing was accomplished by inserting an O-ring into a groove formed about the outer periphery of the push-button which was then inserted into a pipe in order to compress the O-ring between the pipe and push-button. The restoring force was obtained by inserting a spiral shaped spring between the push-button and push-button hole, or by inserting a thin rubber or metallic sheet. However, other functions such as an alarm function, calculator function, and stopwatch function have come to be incorporated in wristwatches in addition to the customary time function, and these added functions require additional push-buttons. Installing a large number of push-buttons one at a time into the side of a wristwatch by means of the conventional push-button device requires an exorbitant amount of labor and precision. These are some of the difficulties that have been encountered in the prior art.

Furthermore, conventional push-button devices adopt a structure in which a coil spring and push-button are inserted into a pipe installed at the side of a timepiece case, with the push-button being restrained within the pipe by means of a stop spring which is pressure fitted into a groove formed in the end of the push-button shaft. Pressure fitting the stop spring into the push-button groove is troublesome and the stop springs are often lost or damaged during disassembly. With the development of electronic timepiece movements, other functions such as calculator or alarm functions have come to be incorporated in such timepieces in addition to the customary time display, and these added functions require additional push-buttons. Installing a large number of push-buttons by means of the convention push-button device entails high costs, assembly difficulties and after-service problems.

It is, therefore, an object of the present invention to provide an electronic calculator wristwatch which can overcome the aforementioned drawbacks.

It is another object of the present invention to provide an electronic calculator watch having separate IC chips for the timekeeping and calculator sections.

It is another object of the present invention to eliminate the difficulties involved in providing the wiring patterns on circuit boards through the provision of an electronic calculator wristwatch with an electronic calculator in which IC chips are arranged in the same plane on a circuit board such that the sides of the IC chips are slanted with respect to the sides of the display device, thereby making it possible to easily furnish the circuit board with the required wiring patterns.

It is another object of the present invention to provide an electronic calculator wristwatch having a push-button device which makes it possible to easily and realiably install a large numer of push-buttons in a timepiece case.

It is a further object of the invention to provide an electronic calculator wristwatch having a water-proof structure for a switch by means of a simple, compact construction.

It is a further object of the present invention to provide an electronic calculator watch having a structure for a push-button switch which is adapted to prevent accidental operation, and provide a safety mechanism for preventing the accidental operation of push-button switches for timekeeping functions.

It is a still further object of the invention to provide an electronic calculator watch having keys classified by color in accordance with their function in order to make it possible to easily distinguish between them.

According to the present invention, there is provided an electronic calculator watch comprising: timekeeping means composed of an oscillator, a frequency divider connected to the oscillator, a counter circuit connected to the frequency divider, and a driver circuit connected to the counter circuit for providing an output signal indicative of time information; calculating means composed of an oscillator circuit and a calculation circuit responsive to perform calculations under control of numerical inputs furnished by external operation device provided on a watch case; and a display device including a first display section connected to the driver circuit of the timekeeping means to display the output signal delivered therefrom, and a second display section connected to the calculating means to display the result of calculations, each of the first and second display sections having a plurality of digit electrodes and a plurality of segment electrodes arranged in a matrix configuration.

Figure 1:
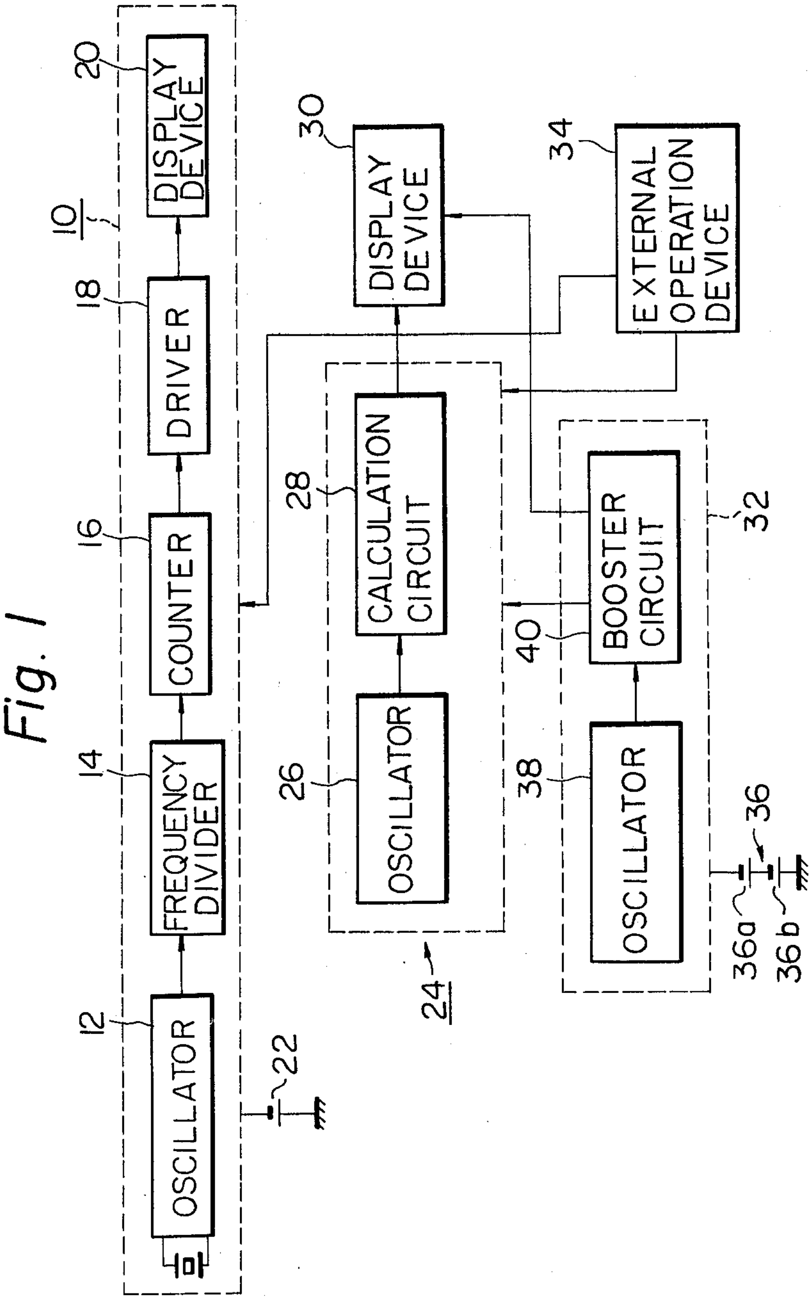
FIG. 1 is a block diagram of a preferred embodiment of an electronic calculator watch according to the present invention.

FIG. 1 is a block diagram of a preferred embodiment of an electronic wristwatch equipped with an electronic calculator in accordance with the present invention. Reference numeral 10 denotes a timekeeping section and includes an oscillator 12, frequency divider 14, counter 16, driver 18, display device 20 arranged in a matrix configuration and power source 22. Electronic calculator section 24 includes an oscillator 26 for calculations, a calculation circuit 28, display device 30 arranged in a matrix configuration, power source 32 and an external operation device 34 composed of numeric and function keys. Power source 32 is composed of a battery 36 made up of two batteries *36a*, *36b*, and also includes an oscillator 38 for boosting voltage, and booster circuit 40.

Figure 2:
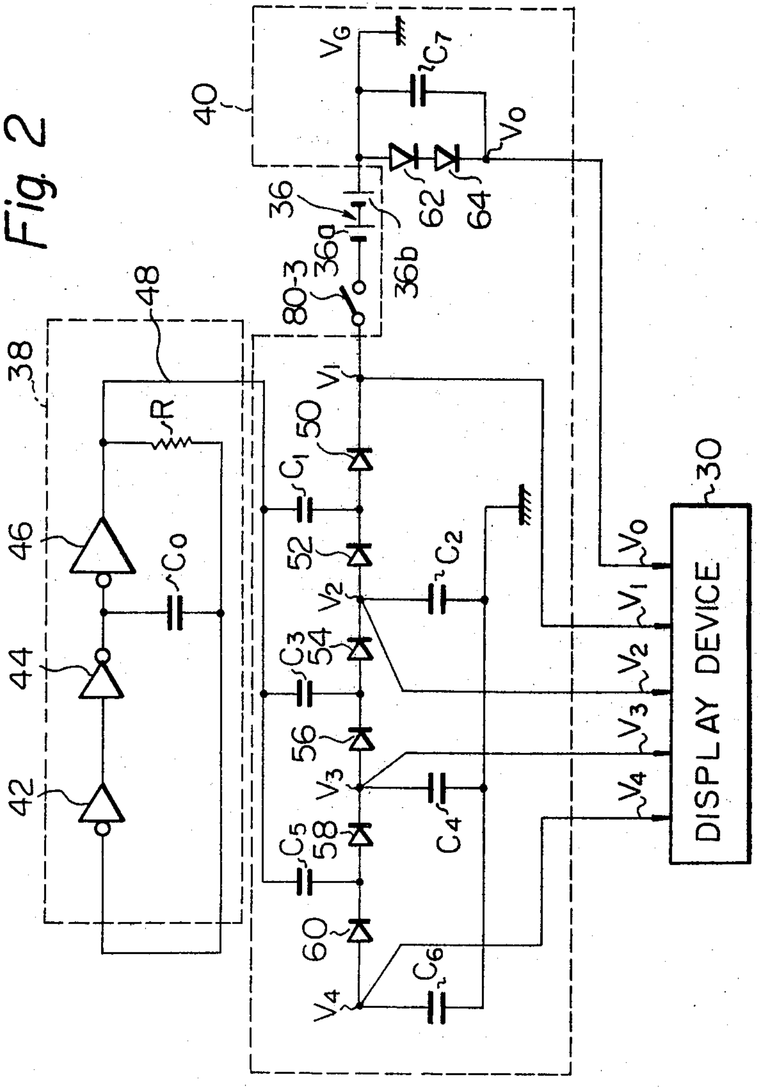
FIG. 2 is a detail electric circuitry for a power source shown in FIG. 1.

FIG. 2 is an embodiment of a booster circuit employed in a power source section 32 which supplies power to the calculator of a wristwatch in accordance with the invention. Oscillator 38 applies an AC current to booster circuit 40. An approximately 300 Hz signal produced by the oscillator is amplified and shaped by inverters 42, 44, inverted by inverter 46 and appears as a rectangular wave output signal on output line 48 which applies the signal to booster section 40. Inverter-amplifiers 42, 44, 46 are of C-MOS type and, by shaping the rectangular wave, reduce by as much as possible the electrical power which flows through the circuit during the switching of the output inverter-amplifier 46. Furthermore, when the threshold voltage Vth of the C-MOS transistor of inverter-amplifier 46 is set close to the power source voltage, the current flow is reduced to a very low level during the switching of the C-MOS transistor even if the input to the inverter has a sine wave component. Therefore, there will be almost no wasteful consumption of power within inverter-amplifier 46 if the threshold voltage of the inverter amplifier is set to at least to a value between 80% of the power source voltage and the power source voltage itself. Accordingly, if oscillator 38 makes use of an independent C-MOS chip which is provided independently from the IC chip ofthe calculator, and if a threshold voltage Vth set close to the voltage of power source 36 is employed, power consumption can be reduced in a manner as previously noted.

The booster circuit 40 has booster diodes 50 through 60 and condensers C1 through C6 in order to provide voltages V1, V2, V3 and V4. Diodes 62, 64 are voltage dropping diodes but may be replaced by resistors or by other semi-conductors such as transistors or thermistors which also serve to compensate for changes in temperature. Reference numeral C7 denotes a condenser connected in parallel with diodes 62, 64; the voltage across condenser C7 is designated by Vo. By connecting in series diodes 62, 64 having the same characteristics as diodes 50, 52, 54, 56 58 and 60 employed in respective booster stages, the voltage drop which occurs across each of the diodes due to the current flow therethrough compensates for each respective potential. Thus, the potentials V0, V1, V2, V3 and V4, with potential V2 as a standard, serve as the matrix driving power sources. In such a case, since the voltage differences between V2 and each of the potentials V0, V1, V3 and V4 are symmetrical, there is almost no DC component so that wasteful power consumption and deterioration of liquid crystals can be prevented.

Figure 3B:
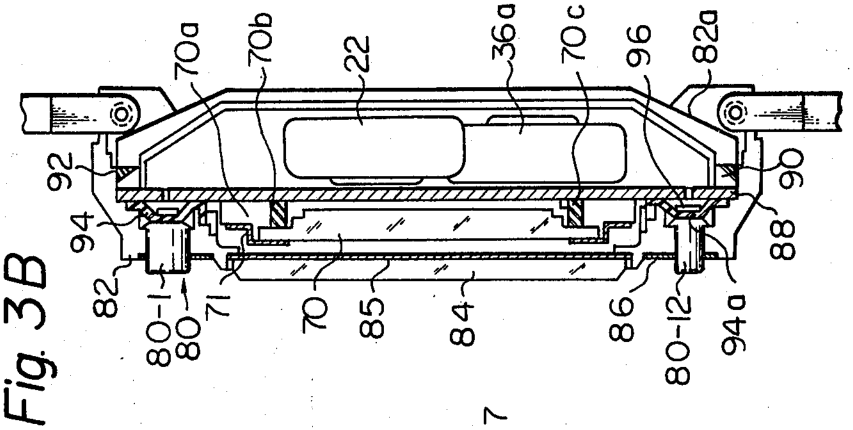
FIG. 3B is a cross sectional view taken along line A—A of FIG. 3A.
Figure 3A:
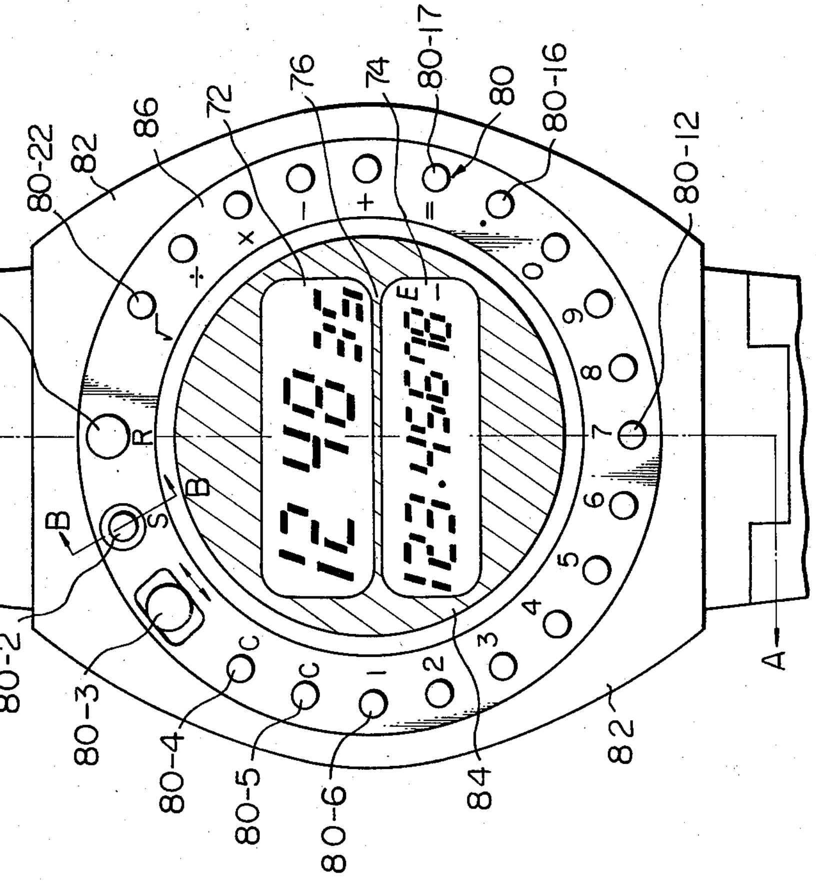
FIG. 3A is a front view of the electronic calculator watch according to the present invention.

FIG. 3(A) is an external view of a wristwatch equipped with an electronic calculator in accordance with the invention, and FIG. 3(B) is a cross-sectional view of FIG. 3(A) taken along the line A—A. The display section of the watch makes use of liquid crystal in which a single liquid crystal cell 70 is employed for both the timekeeping and calculation data display. Time display 72 and display section 74 for the calculator are clearly set apart from each other by a partitioning line 76. The time display makes use of a matrix driving method and the calculator display adopts a matrix driving method. Reference numeral **70*a* denotes a liquid crystal cell frame, and reference numerals 70*b* and 70*c*** designate stacked layers of electrically conductive rubber for the purpose of establishing connections for the liquid crystal cell.

Calculator keys 80 along with push-buttons for the timekeeping functions such as those which are used for a time correction are arranged on the face of the timepiece case 82 and surround the display. R-switch 80-1 is used for switching between a calendar display (month and date) and time display (hours, minutes, seconds), and can also be used to effect time corrections. S-switch 80-2 selects the digit which is to be corrected, and switch 80-3 denotes a power source switch for the calculator section of the wristwatch; the power supply can be turned on and off by sliding the switch in the direction of the arrows. The lower portion of the slide key for the power source switch is elongated in shape and an oblong hole in the case is shielded from view. The upper portion of the key is rounded so as to be more compatible with the other keys. Switch 80-4 denotes an all-clear key, and switch 80-5 a clear-entry key. These keys are usually indicated by CA and CE but have been simplified here to C, C. Switches 80-6 to 80-16 are numeric keys for the calculator, and switches 80-17 to 80-22 are function keys which include addition, subtraction, multiplication, division and square root keys. All of the switches with the exception of switch 80-3 are of the push-button type, and designed so as to be operable without projecting beyond the surface of watchglass 84. Indicated at 85 is a glass support plate. When the keys are disposed along the circumference of the timepiece as shown, the numbers or symbols assigned to each key are placed on the inwardly facing or outwardly facing side of the keys rather than between them in order to avoid the danger of erroneous operation. Furthermore, it is possible to suitably color the heads of the keys or the inscription plate 86 so that the functions of the keys can be distinguished in order to prevent erroneous operation.

Reference numeral 88 denotes a circuit board, 90 a packing seat and 92 packing. The water-proof structure for the key section is composed of key 80, a ring-shaped elastomeric member 94 of rubber or the like serving a water-proofing function, and a projection **94*a* protruding from elastomeric member 94 and corresponding to key 80-12. A piece of electrically conductive rubber 96 is attached to each projection 94*a*. Contacts 80-1*a*, 80-2*a*, and 80-4*a* through 80-22*a* to be described later with respect to FIG. 4 are formed on circuit board 88 in positions corresponding to the pieces of electrically conductive rubber 96**.

Figure 4:
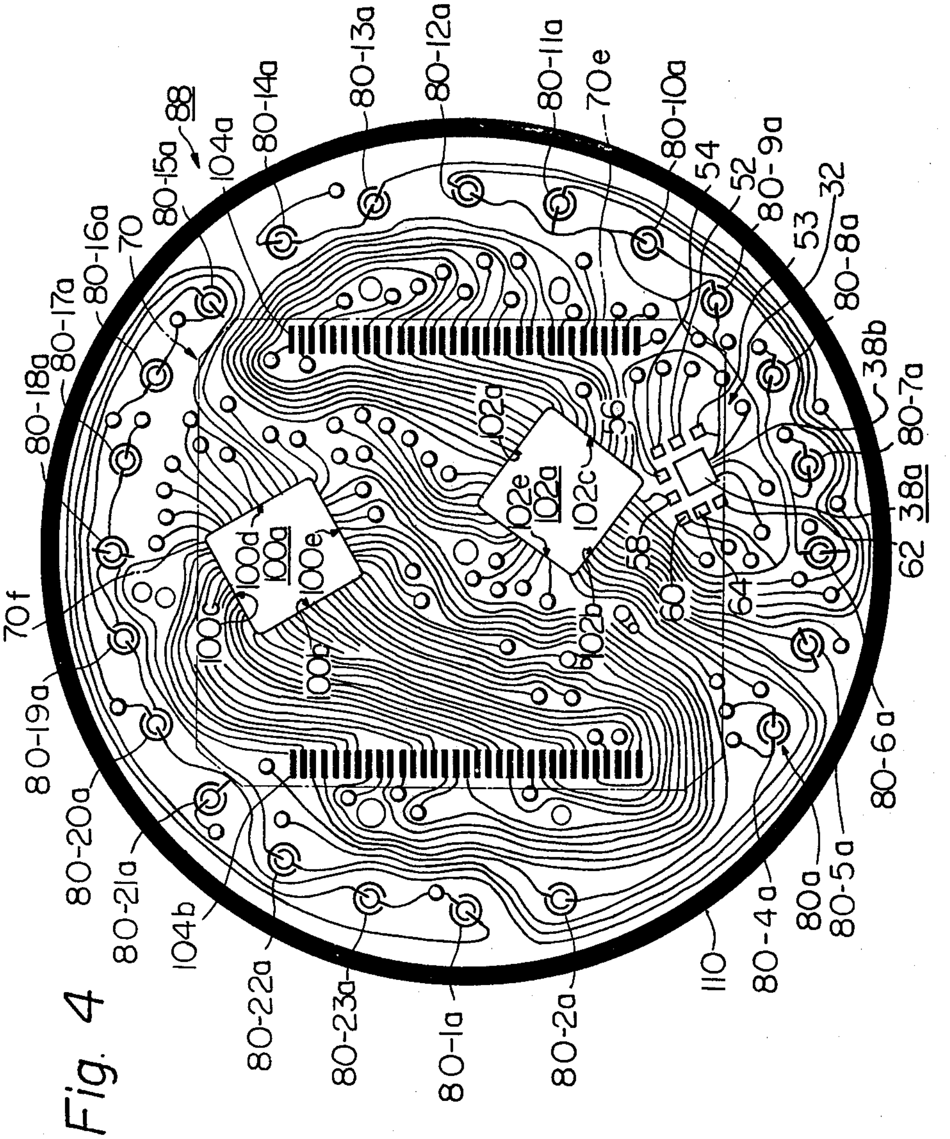
FIG. 4 is an enlarged plan view of a circuit board forming part of the watch shown in FIG. 3B.
Figure 5:
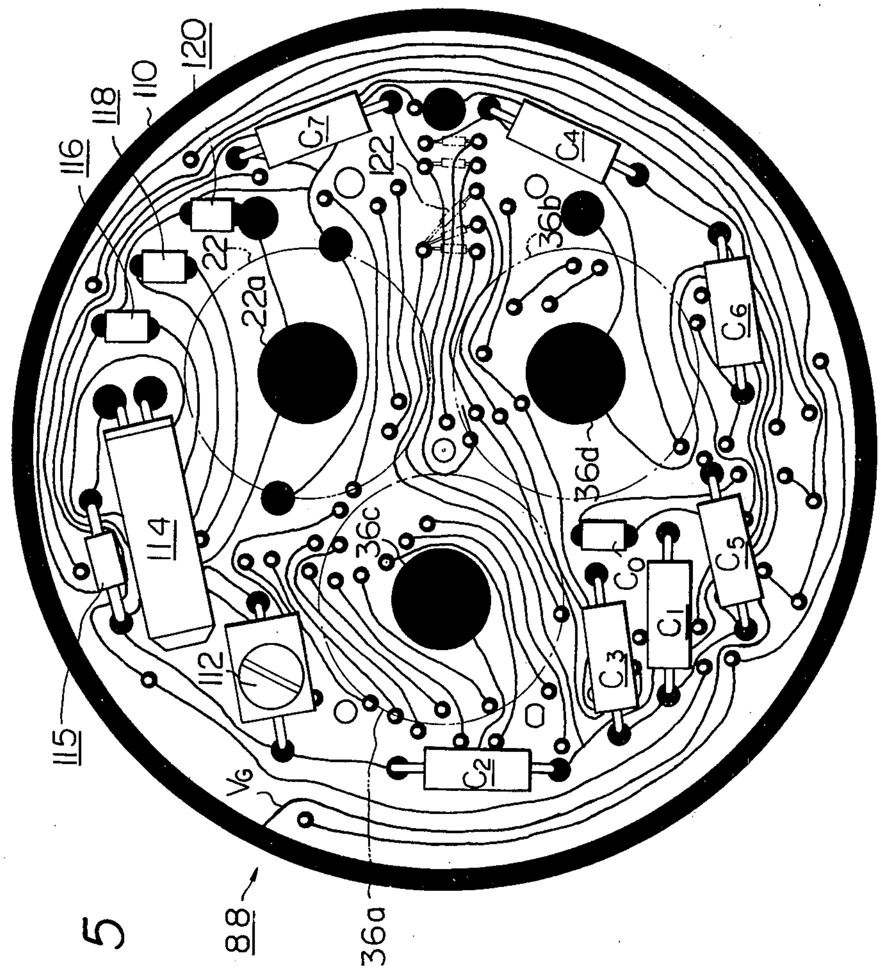
FIG. 5 is an bottom view of the circuit board shown in FIG. 4.

FIG. 4 is an enlarged plan view of a circuit board for use in the wristwatch of the present invention, and FIG. 5 is a rear view of the circuit board shown in FIG. 4.

In FIG. 4, circuit board 88 is circular in shape so as to conform to the inner wall of case 82. Mounted on the circuit board are two independent IC chips **100*a* for the timekeeping section of the watch and 102*a* for the calculator section. The circuit board also positions power source 32, i.e., a booster oscillator chip 38*a*, for driving the calculator IC chip 102*a*, as well as voltage dropping diodes 62, 64 and booster diodes 50 through 60 which surround booster oscillator chip 38*a* on three sides with the exception of side 38*b* from which its leads are obtained. The diodes 50 through 64 are disposed in a C-shaped pattern around the chip 38*a*. This arrangement facilitates the extraction of the leads from the lead extraction side 38*b* of booster oscillator chip 38*a* and promotes the bonding of wires for diodes 50 through 64. It also allows wiring to be performed without interfering with other lead patterns, permits power source 32 with the exception of condensers C1 through C7 to be reduced in size, and is such that chip 38*a* and diodes 50 through 64** can easily be resin bonded in one group.

Reference numerals **80-1*a*, 80-2*a*, and 80-4*a* through 80-22*a* denotes electrical contacts formed on a conductive pattern about the circumference of circuit board 88; the electrically conductive rubber 92 attached to elastomeric member 94 is brought into contact with one of the afore-mentioned electrical contacts when a key 80 is depressed. Reference numeral 80-23*a*** is used when other function keys are increased.

The display device denoted by the phantom line, i.e., liquid crystal cell 70, is mounted approximately at the center of circuit board 88 through the intermediary of a liquid crystal cell frame **70*a* and, by means of the stacked pieces of electrically conductive rubber 70*b*, 70*c*, is brought into contact with portions 104*a*, 104*b*** of the electrically conductive pattern formed on the circuit board.

The positional relationship between IC chips **100*a*, 102*a* and liquid crystal cell 70 is such that the sides 100*b* through 100*e* of IC chip 100*a* and the sides 102*b* through 102*e* of IC chip 102*a* lie in the same plane and are slanted with respect to side 70*e* or 70*f* of liquid crystal cell 70; in other words, the chips are disposed such that their sides do not lie in parallel with the sides of the liquid crystal cell. Accordingly, the lead patterns extracted from sides 100*b***, *100c*, **100*e* of IC chip 100*a* can be led to pattern 104*b* without hindrance, while the lead patterns extracted from sides 102*c*, 102*d* of IC chip 102*a* can be readily led to pattern 104*a*. Moreover, the remaining lead patterns extracted from sides 100*d*, 100*e*, 102*c*, 102*d* and 102*e* of IC chips 100*a* and 102*a* and led to patterns 104*a* and 104*b* can be properly routed by means of a small number of through-holes. These through-holes are adapted such that the other lead patterns on circuit board 88** can be clustered and the center of the circuit board effectively used to readily form a closed loop.

As for the wiring from IC chip 102*a* to contacts 80-1*a*, 80-2*a*, and 80-4*a* through 80-23*a*, a desirable condition is that the number of through-holes be reduced to as great an extent as possible. For example, with respect to the lead patterns extracted from side 102*b* of IC chip 102*a*, the wiring is accomplished by first routing the lead patterns to the circumference of circuit board 88 and then connecting them to a desired contact 80*a*; this allows a weakening in the mechanical strength of the circuit board to be avoided since the number of through holes is reduced. This is also the reason why a portion of the lead patterns from the IC chips cross patterns 104*a*, 104*b* once and are then turned back and connected to the patterns from the circumference of the circuit board. The outermost part of the periphery of circuit board 88 is furnished with an electrically conductive pattern 110 for providing an electrical ground between wire bonds and the circuit board when IC chips 100*a*, 102*a* and booster oscillator chip 38*a* are wire bonded. This protects the IC chips and oscillator chip from electrical damage. Pattern 110 also serves as a reinforcing member which strengthens the circuit board.

In FIG. 5, battery seating patterns 22*a*, 36*c* and 36*d* are formed at the central portion of circuit board 88 on its back side and serve to mount and provide electrical connecting for timekeeping battery 22 and calculator batteries 36*a* and 36*b*, respectively. The batteries form a center about which are disposed a booster condenser C0, condenser C1 through C7, trimmer condenser 112, crystal controlled oscillator 114, temperature compensating condenser 115, booster condenser chips 116, 118 for driving display device 20 of the timekeeping section, a battery condenser chip 120 connected in parallel with battery 22, and a group of resistors 122. This arrangement, disposes the batteries, which are largest and thickest components, in the center of the case while all other components are secured to the circuit board in a dispersed fashion about its circumference, a feature which allows the case to be designed as shown in FIG. 3. As can be appreciated from the drawing, the case has an tapered side surface 82*a* and is thus thinner along the circumference than at the center. The overall case thus appears to be quite slender and possesses an attractive design. It may readily be understood, therefore, that the arrangement of components on the circuit board 88 permits the case to be reduced in size and improved in appearance.

Figure 6:
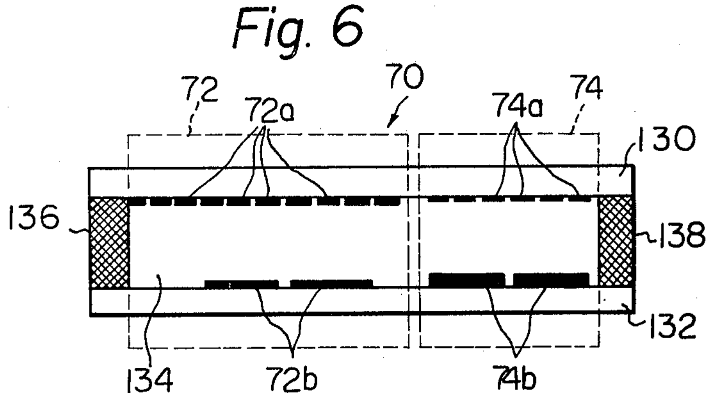
FIG. 6 is a cross sectional view of a preferred embodiment of a display device shown in FIG. 1.

Referring to FIG. 6, there is shown in cross section a preferred example of a liquid crystal display cell 70. As shown, the liquid crystal display cell 70 includes a pair of spaced transparent glass plates 130 and 132 between which is suitably sealed a body of suitable liquid crystal material 134 such as a suitable body of nematic liquid crystal material by means of spacers 136 and 138. In such an arrangement, the liquid crystal display cell is composed of first display section 72 and second display section 74 integrally formed within the single cell 70. The first display section 72 comprises a plurality of segment electrodes 72*a* located on the inner surface of the transparent glass plate 130, and a plurality of digit electrodes 72*b* located on the inner surface of the transparent glass plate 132, the segment electrodes and the digit electrodes being arranged in the form of a matrix configuration. Thus, the segment electrodes 72*a* are displaced from and disposed opposite the digit electrodes 72*b*. Likewise, the second display section 74 comprises a plurality of segment electrodes 74*a* located on the inner surface of the transparent glass plate 130, and a plurality of digit electrodes 74*b*, the segment electrodes and the digit electrodes being arranged in the form of a matrix configuration in which the segment electrodes 74*a* are displaced from and disposed opposite the digit electrodes 74*b*.

Figure 7:
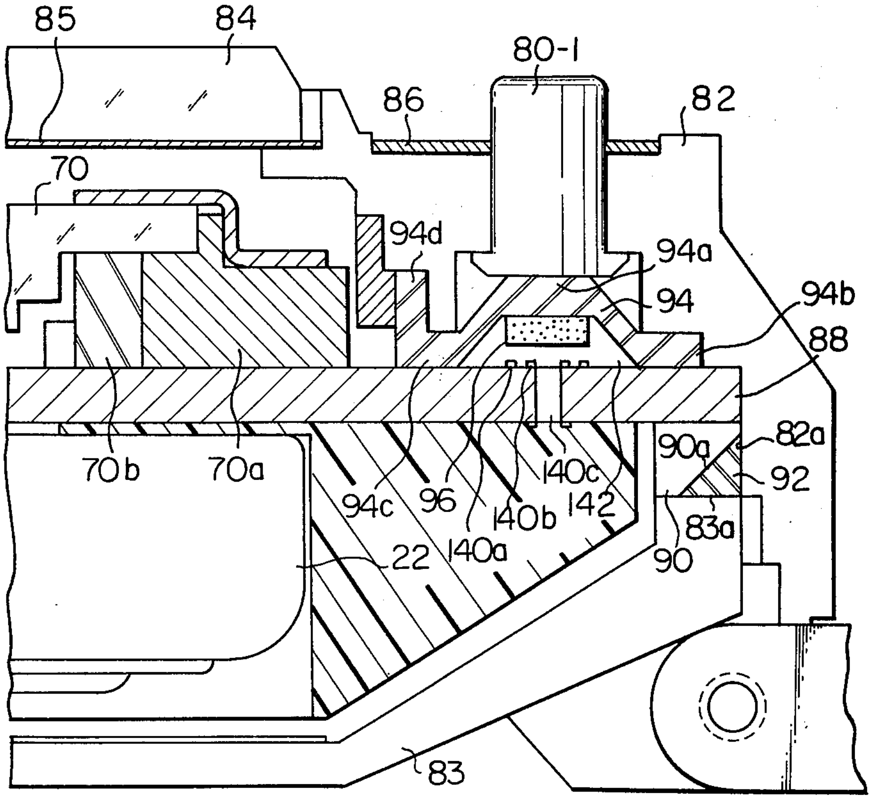
FIG. 7 is an enlarged cross sectional view showing essential part of the watch shown in FIG. 3B.

FIG. 7 is a cross-sectional enlarged view of the essential portion of FIG. 3B and illustrates a wristwatch arrangement, in accordance with the invention.

A water-proof structure for a key in accordance with the invention will now be described with reference to FIG. 7. The water-proof structure for a key 80-1 includes ring-shaped elastomeric member 94 provided with projection 94*a* having a piece of electrically conductive rubber 96 adhered to the back side of the projection 94*a*. Circuit board 88 is provided with an electrode pattern having contacts 140*a*, 140*b* in opposition to the conductive rubber 96. FIG. 7 shows key 80-1 in the OFF position. However, when the key is depressed, elastomeric member 94 is compressed and deformed so that the electrically conductive rubber 96 comes into contact with contacts 140*a*, 140*b* thereby producing a prescribed input signal. When the force depressing key 80-1 is removed, elastomeric member 94 is returned to its original position and the key is once again in the OFF position. According to this structure, circuit board 88 will sustain absolutely no damage even if through some unforseen accident an unnecessarily large force is applied to the key when it is depressed. This feature is made possible by the fact that electrically conductive rubber 96 and elastomeric member 94 are suitably deformable regardless of how the key is manipulated. Moreover, a water-proof structure is obtained by virtue of the fact that elastomeric member 94 is held tightly between case 82 and circuit board 88 at its inner fringes 94*c*, 94*d* and its outer fringe 94*b*. A through-hole 140*c* bored through circuit board 88, in addition to serving as a hole through which an electrical conductor will pass, serves as an air vent which also prevents an increase in air pressure which would otherwise build up in chamber 142 defined between circuit board 88 and projection 94*a* of the elastomeric member. Such an increase in air pressure would be the result of depressing the key. Case 82 and back cover 83 are water-proofed by a structure which incorporates ring-shaped packing seat 90 having slanted wall 90*a*, O-ring 92 and the back cover 83. Water-proofing is assured by O-ring 92 which is compressed by the horizontal surface 83*a* of back cover 83, the inclined surface 90*a* of packing seat 90, and the inner surface 82*a* of case 82. The water-proofing effect along the horizontal surface 83*a* of back cover 83 and along the inner surface 82*a* of case 82 is enhanced by virtue of the inclined surface 90*a* between packing seat 90 and O-ring 92. This structure also allows the outer diameter of the case to be reduced. Circuit board 88 and packing seat 90 are provided with a small hole which engages with a pin (not shown) designed to prevent their mutual rotation; this also serves to position these members once they have been installed within the case. The liquid crystal cell 70, through the intermediary of a piece of connective rubber 70*b*, is resiliently fixed by means of a cell retention spring 71 to a connection terminal on circuit board 88. The circuit board is provided on both sides with a copper foil pattern and is also designed to serve as the base plate of the timepiece while accommodating IC circuits and other electrical components as previously noted. The circuit board is also provided with an insulative coating except at required portions.

Figure 8:
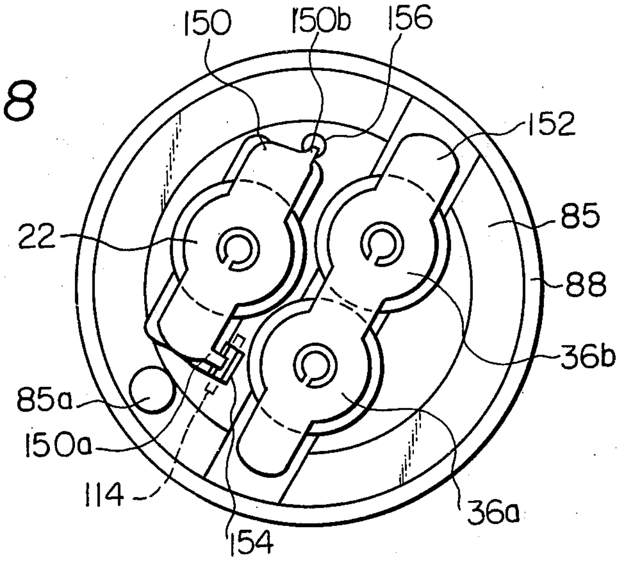
FIG. 8 is a view illustrating a battery arrangement of the watch shown in FIG. 3B.

FIG. 8 illustrates the structure of a battery accommodating compartment for the wristwatch in accordance with the invention. Three batteries are employed as power sources: 22 is a battery exclusively for the timekeeping section while *36a* and *36b* are series connected batteries independently provided for the calculator section of the wristwatch. This means that the timekeeping function will be unaffected and that this section of the watch will continue to operate even if the batteries for the calculator section are consumed. The watch is designed such that batteries 22,36a,36b are grounded in the center and surrounded circumferentially by other electrical components in order to make effective use of space and reduce the size of the watch.

Figure 9:
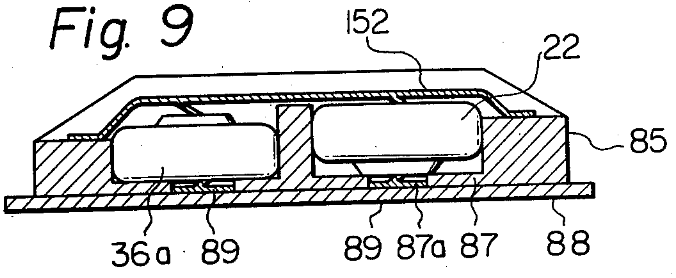
FIG. 9 is a cross section showing the relationship between the batteries and other associated parts.

FIG. 9 is a cross-sectional view of the battery accommodating compartment in which reference numeral 85 denotes a device cover which is made of insulating material and provided with a hole or recess for covering batteries 22, 36a, 36b and other electrical components in order to protect them. Device cover 85 is also provided with a through-hole 85a corresponding to the location of a trimmer condenser so that the condenser can be manipulated with the cover in place for the purpose of adjusting the frequency, a feature which prevents inadvertant contact with other components. Reference numeral 87 denotes a battery seat integral with the device cover 85 to prevent shocks applied to the batteries from transmitting to the circuit board 88 and provided with a hole 87a corresponding to the position of the battery accommodating compartment. A battery retention spring 89 is fitted into the hole 87a. Reference numerals 150, 152 designate battery keep springs. Keep spring 150 for the battery of the timekeeping section is provided with a projection 150a for pressuring a portion of a crystal oscillator 114 confined within a recess 154 located within the device cover. Keep spring 150 thus serves as a damper to protect the oscillator from vibrations and impact. The other end 150b of keep spring 150 is connected to a ground wire through a hole 156 in device cover 85 in order to ground the oscillator. This structure allows both electrodes of the battery to be resiliently supported so that damage due to instantaneous impact can be prevented.

Figure 10:
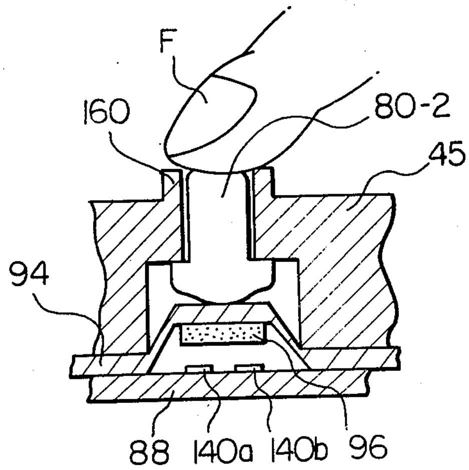
FIG. 10 is an enlarged, fragmentary cross sectional view taken on line B—B of FIG. 3A.

FIG. 10 is a partial cross-sectional view taken along the line B—B of FIG. 3A. In FIG. 10, reference numeral 160 denotes a collar projecting outward from the case 45 which, according to the invention, prevents accidental operation of the key and is either flush with the top of the key or projecting slightly beyond it. As can be appreciated from the drawing, the collar is so designed that a finger F cannot accidentally depress key 80-2. Thus, a time correction cannot be accomplished unless the tip of a ball-point pen of pencil or the like is employed to depress key 80-2. This configuration thus makes use of an extremely simple structure to prevent accidental operation of the timepiece so that the time can be accurately maintained. Moreover, although the collar 160 in the present embodiment is integrally formed with the case, such a projection can be formed separately and then attached. It is also possible to do away with the collar and adopt a structure in which the key itself is flush with the surface of the case or recessed below it.

Figure 11:
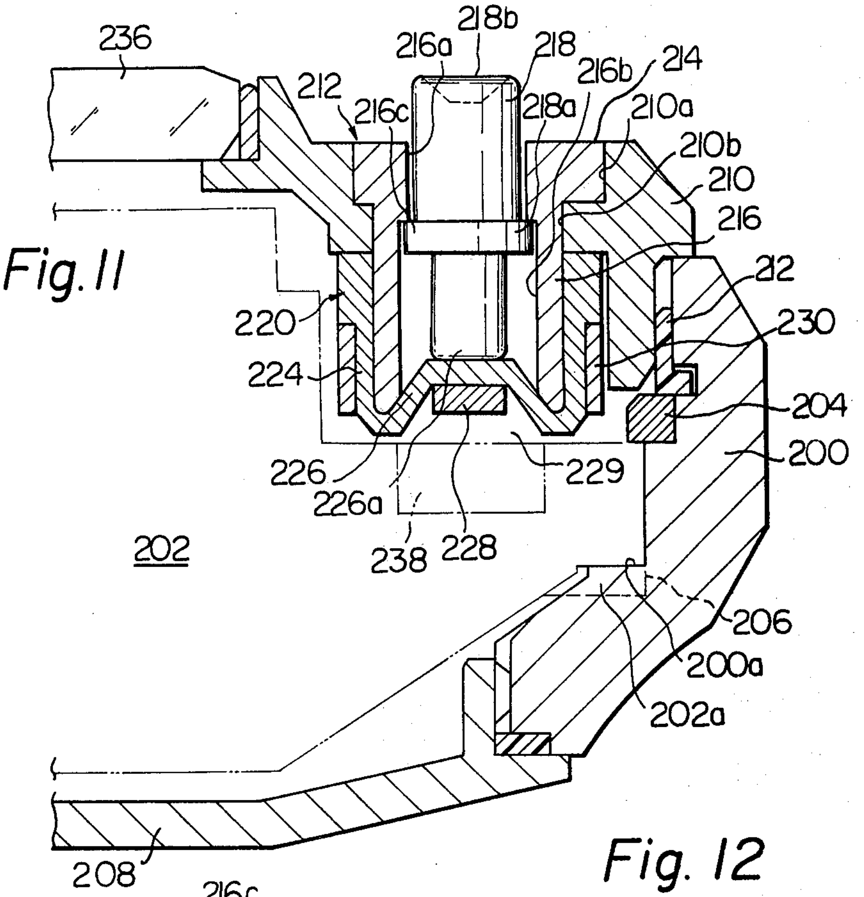
FIG. 11 is an enlarged cross sectional view illustrating a modification of the watch shown in FIG. 7.
Figure 12:
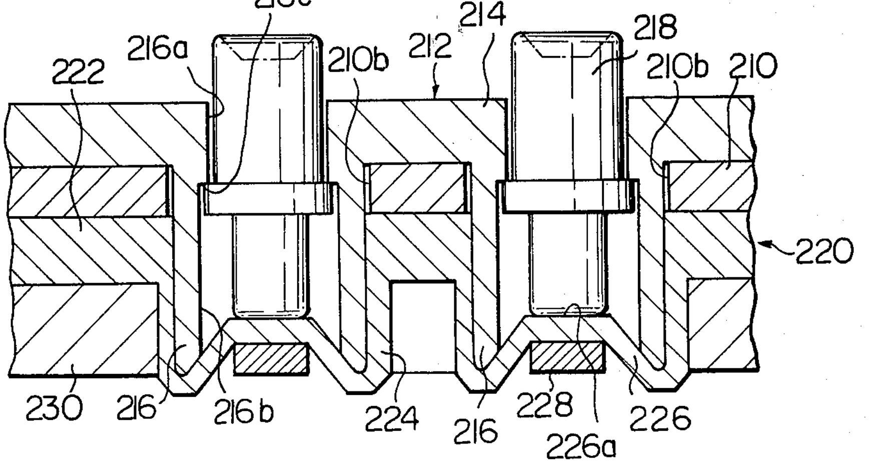
FIG. 12 is an enlarged fragmentary view illustrating a part of the structure shown in FIG. 11.
Figure 13:
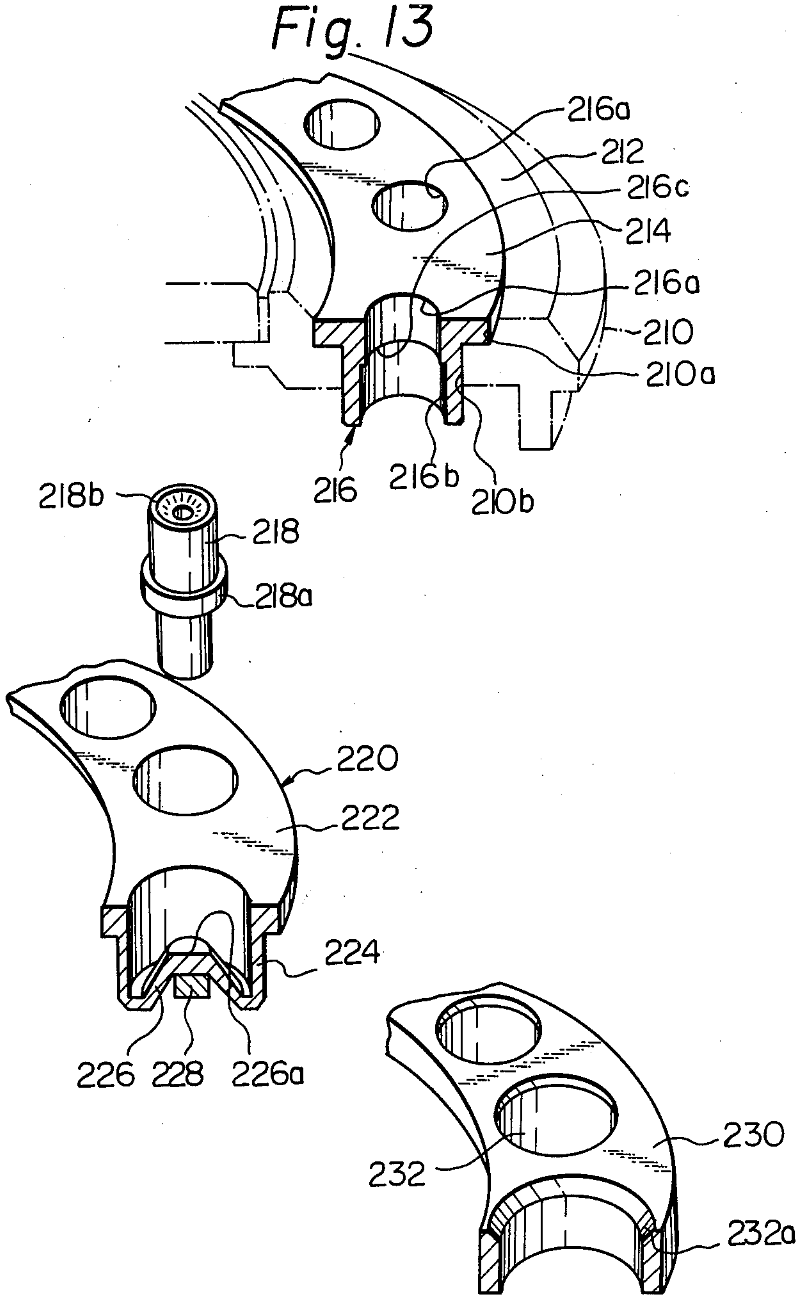
FIG. 13 is a disassembled view showing a push-button device forming part of the watch according to the present invention.

FIGS. 11 to 13 illustrate a modification of the structure shown in FIG. 7. In this modification, case 200 tightly holds module 202 between a step 200a and a ring 204, the module being prevented from rotation by engagement between a notch 206 formed in step 200a and a projection 202a protruding from the module.

Back cover 208 is in threaded engagement with case 200. Bezel 210 is secured to case 200 through the intermediary of a packing 212 having an L-shaped cross-section. The upper surface of bezel 210 is provided with an annular groove 210a the bottom of which has a plurality of through-holes 210b bored therethrough at circumferentially spaced positions. Packing 212 also serves to prevent ring 204 from becoming dislodged.

Ring member 212 serving as a support for push-buttons comprises annular ring portion 214 disposed in the annular groove 210a of the pedestal 210 and a plurality of cylindrical projections 216 formed on the annular ring portion 214 at circumferentially spaced positions, each projection extending through the corresponding through-hole 210b in bezel 210. The inner wall of cylindrical projections 216 is formed with stepped bores 216a and 216b between which annular shoulder 216c is formed. A push-button 218 is disposed in the stepped bores 216a, 216b in such a manner that the push-button is movable in the direction of its axis. Push-button 218 is columnar in design; installed in stepped bores 216a, 216b so as to be axially movable and formed along its central portion with a flange 218a which comes into abutting contact with shoulder 216c of ring member 212. The upper end of the push-button is formed with a trapezoidal recess 218b for the sake of operational ease.

Elastomeric member 220 possesses the same ring-shaped configuration as ring member 212. Elastomeric member 50 has annular ring portion 222 and a plurality of tubular portions 224 extending therefrom at circumferentially spaced positions, each engaging at its inner periphery for with each cylindrical portion 216. The tubular portion 224 has a mountain-shaped bottom 226 which restores push-button 218 to its original position by pressing it upward at its point of contact with the summit 226a of bottom 226. Further, a piece of electrically conductive rubber 228 is attached to the lower surface of bottom 226. The conductive rubber is made of conductive material in which resistance decreases as the pressure applied thereon increases, such as conductive rubber containing carbon powder.

Holding member 230 also possesses the same ring-shaped configuration as ring member 212 and elastomeric member 220 and is formed at its circumferentially spaced positions with a plurality of holes 232 which, along with cylindrical portions 216, serve to apply pressure to tubular portions 224 of elastomeric member 220. The surface at the upper end of each hole 232 is provided with a tapered face 232a to allow holding member 230 to be easily slid over tubular portion 224.

To assemble the push-button device having the structure as described above, cylindrical portion 216 of ring member 212 is force fitted into through-hole 210b of bezel 210; at the same time, the annular ring portion 214 of ring member 212 is fitted into annular groove 210a formed in bezel 210. In this case it is preferable that ring member 212 be fabricated from a synthetic resin the elasticity of which will allow the absorption of any manufacturing errors in the design of through-hole 210b or cylindrical portion 216. This will facilitate the fitting of the cylindrical portion into the hole.

Next, each push-button 218 is inserted into ring member 212 by pushing it from the bottom through holes 216a and 216b, and elastomeric member 222 is slipped over cylindrical portions 216 of ring member 212. At this time, the upper surface of push-button 218 is positioned below the upper surface of watch glass 236 so that the push-button cannot be accidentally depressed. Finally, holding member 230 is pressure fitted over tubular portions 224 of elastomeric member 220. This completes the assembly procedure.

The push-button device assembled in this manner fully meets push-button operational requirements. When push-button 218 is depressed, bottom 226 of elastomeric member 220 is elastically deformed so that electrically conductive rubber 228 contacts switch portion 238 of module 202.

Since a space 229 defined between bottom 226 and module 202 is air-tight, an air escape groove may be provided in a portion of bottom 226 or module 202. Moreover, although the watch case in this modification is shown as being separate from bezel 210, an integrated structure can be adopted as the watch case. The push-button device as thus described makes it possible to easily install a large number of push-buttons and provide a water-proof structure. As the push-button restoring force and water-proof property are simultaneously obtained by means of an elastomeric member of a simple structure, the cost of production can be greatly reduced.

Figure 14:
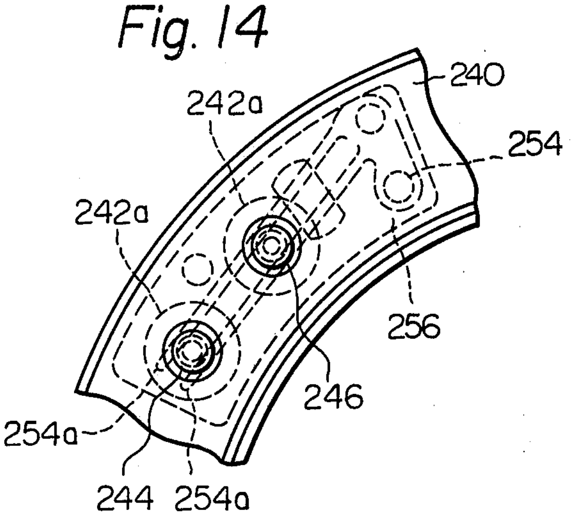
FIG. 14 is a fragmentary view showing a modification of the push-button device for the watch shown in FIG. 3A.
Figure 15:
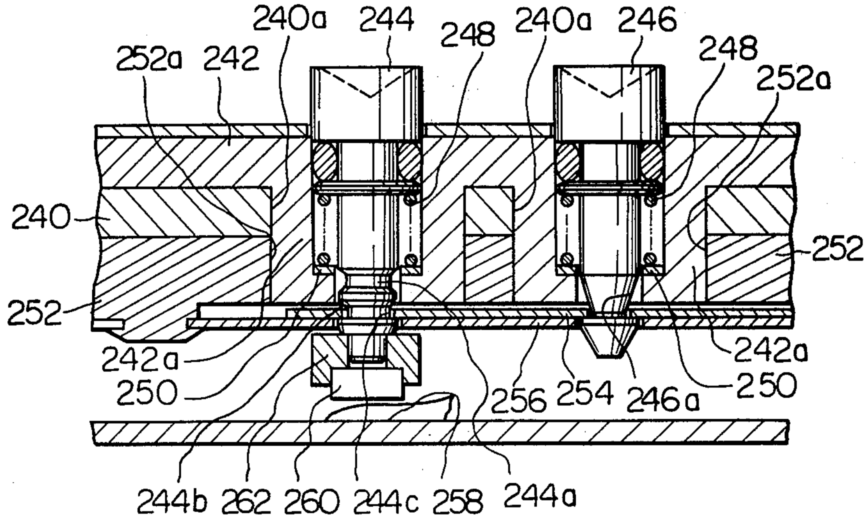
FIG. 15 is a cross section of the device shown in FIG. 14.

FIG. 14 is a plan view showing another modification of a switch construction for the wristwatch shown in FIG. 3A, and FIG. 15 is a cross-sectional view of FIG. 14.

In FIG. 14, attached to the upper side of a case 240 is a ring member 242 having pipe or cylindrical portions **242*a* which accommodate button 244 and button 246, a coil spring 248, and a washer 250. To the lower side of the case 240 is attached an annular ring member 252 having a switch spring 254 and a spring support member 256. The annular member 252 has a plurality of bores 252*a* into which pipe portions of ring 242** are loosely fitted.

In FIG. 15, the switch is shown in the OFF position. In this case, two flexible members **254*a* of switch spring 254 make use of their uniform flexibility and resiliency to sandwich and hold groove 244*a* of button 244; the switch is therefore held in the OFF state due to the fact that a prescribed gap is maintained between an electrode pattern 258 and a rubber contact 260 adhered to a contact washer 262 attached to the tip of button 244. When button 244 is depressed, a tapered portion 244*b* spreads the flexible members 254*a* and brings rubber contact 260 into contact with electrode pattern 258. With button 244 in the depressed position, flexible members 254*a* engage with a groove 244*c* formed in the button so that the switch is held in the ON state. At this time, button 244 is subjected to an upwardly acting force as applied by coil spring 248, and the upward movement of elastic members 254*a* is restricted by pipe 242*a* of ring 242. Even though elastic members 254*a* have been spread by turning the switch ON, button 244 is disposed further from the stem of the elastic members than button 246 so that the tapered portion 246*a* of button 246** remains sufficiently engaged with the elastic members.

To turn the switch OFF, button 246 is depressed so that its tapered portion **246*a* spreads elastic members 254*a* thereby disengaging the elastic members from groove 244*c* of the button 244. The button 244 is then restored to the OFF position by virtue of the restoring force of coil spring 248. If the hand of the operator is removed from OFF button 246, coil spring 248 will also return it to its original position. When ON button 244 is returned to its original position, the speed with which coil spring 248 returns the button may exceed the speed at which elastic members 254*a* are restored to their normal positions; accordingly, washer 262 will strike switch spring pressing member 256** to prevent the button from becoming dislodged.

The construction of the switch as described above is highly reliable and suited to an arrangement in which the switches are disposed at the circumference of the watch case. The switch also makes use of push-buttons as do the other keys of the calculator so that there is harmony of design. Finally, although contact 260 of ON button 244 is secured to the button through the intermediary of contact washer 262, it is also possible to attach the contact directly to the ON button.

Figure 16:
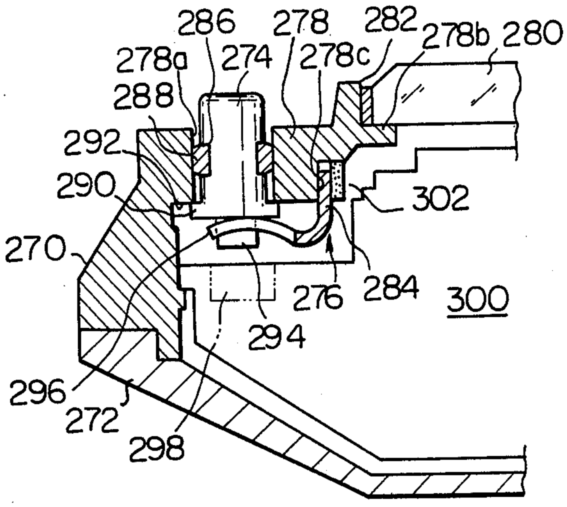
FIG. 16 is a cross section showing another modification of the push-button device for the watch shown in FIG. 3A.
Figure 17:
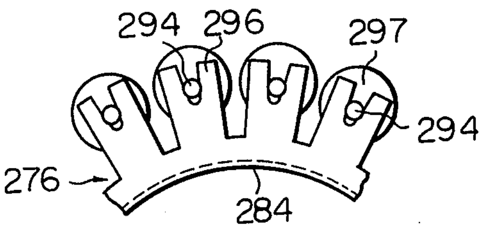
FIG. 17 is a fragmentary plan view of a part of the device shown in FIG. 16.

FIGS. 16 and 17 represent still another modification of a switch construction. Reference numeral 270 denotes a watch case having a back cover 272, reference numeral 274 denotes a button, and reference numeral 276 designates a ring member formed from a thin sheet. The wall 278 at the upper portion of case 270 is formed with a button hole **278*a* for accommodating button 274, and a watch glass 280 is fixed to the shoulder portion 278*b* of wall 278 through the intermediary of packing 282. The wall 278 is provided with annular wall 278*c* with which ring portion 284 of ring member 276 engages. Button 274 is installed in button hole 278*a* so as to be axially movable and is formed with a groove 286 for accommodating a water-proofing O-ring 288 which is thus brought into pressured contact with the inner surface of button hole 278*a*. The lower end of the button is provided with a collar 290 which prevents the button from moving out of the whole by coming into abutting contact with inner wall surface 292 of case 270. The collar may be formed about the entire periphery of the button or only at required portions. The button 274 has at its bottom wall an engaging stem or projection 294 which engages with elastic tongues 296 of ring 276 and which is designed to come into contact with a portion of a switch 298 that is part of movement 300. Ring portion 284 of ring member 276 is held between annular wall 278*c* and a pressure fitted ring 302, and a plurality of elastic tongues of ring member 276 extend radially from the ring portion 284 for upwardly urging the corresponding buttons 274, each elastic tongue having a notch 287 at its tip into which the stem 294 of the button 274 is inserted. Stem 294 may be integrated with button 274 or can be fabricated from synthetic resin or electrically conductive rubber and then implanted into the button. It is also permissible to cut stem 294 from button 274 and attach it to elastic tongue 296**.

Figure 18:
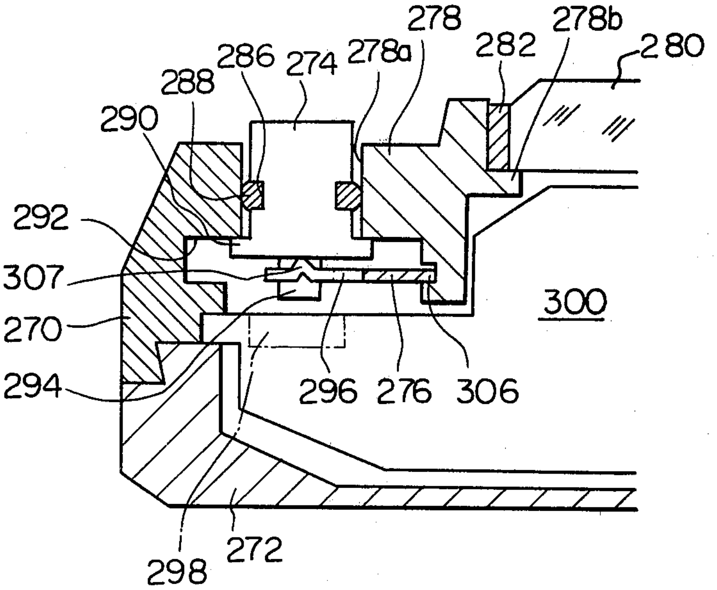
FIGS. 18 and 19 show a modification of the device shown in FIGS. 16 and 17.
Figure 19:
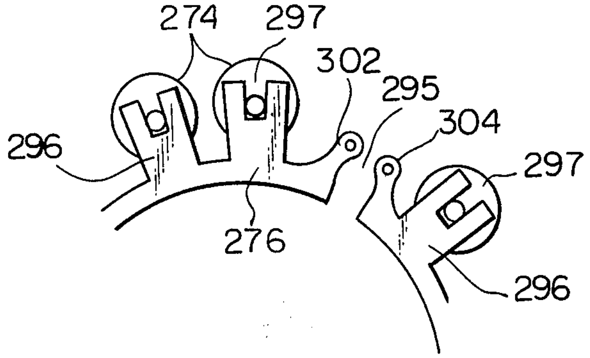

FIGS. 18 and 19 depict a modification of the structure shown in FIGS. 16 and 17, with identical components bearing identical reference numerals. Ring 276 has a plurality of elastic tongues 296 which are provided with enough elastic force to upwardly urge push-buttons 274, and has a slit 295 at a portion thereof. Thus, in order to install ring 276 within case 270, slit 295 is opened by inserting the proper tool into holes 304 formed in ears 302 located adjacent the slit. The ring which is thus opened is then fitted into a groove 306 formed in case 270. The structure of all other components is as described with regard to the previous embodiment. However, elastic tongue 296 of ring 276 is provided with a bend 307 which improves the contact of button 274. It is also possible to install the push-button device of the present invention is a separately provided bezel rather than in case 270.

Thus, a plurality of push-button holes is disposed about the side surface of the case, and installed in each of these holes is an axially movable push-button having a collar for abutting against the inner wall of the case at the bottom of the hole. Secured to the inner wall of the case is a ring having a circumferentially provided elastic tongue for applying pressure to the button in the direction of its axis, the collar of the button being supported and retained elastically between the inner wall of the case and the elastic tongue. This allows a large number of push-buttons to be easily and reliable installed and the number of parts to be reduced, a factor that permits production costs to be lowered.

Figure 20:
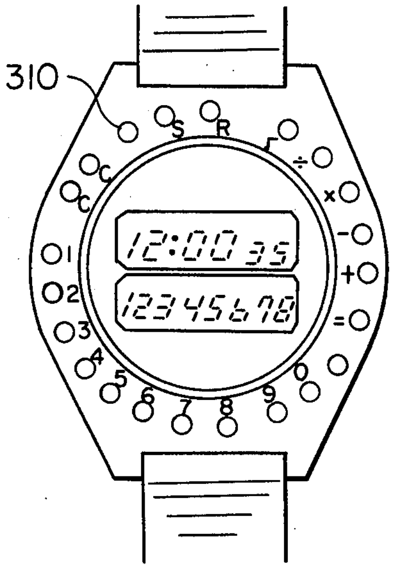
FIGS. 20 and 21 show a further modification of the switch shown in FIG. 3A.

FIG. 20 illustrates a modification of the wristwatch shown in FIG. 3A. In this modification, the slide-switch 80-3 is replaced with push-button 310 in order to obtain a water-proof structure by a simple construction. When making use of a push-button for the power source switch, it is permissible to adopt a structure according to which the push-button is mechanically held in the depressed state; this, however, will lead to complications in design. The present invention therefore makes use of a memory circuit which will hold the power supply in the ON state even after push-button 310 has returned to its original position. The power supply is switched to the OFF state by pressing push-button 310 a second time.

Figure 21:
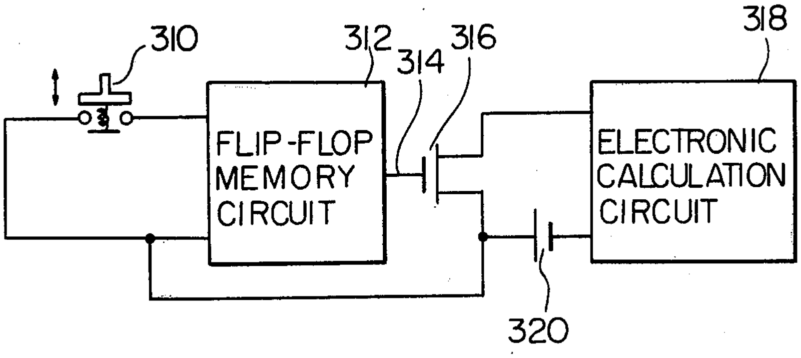

FIG. 21 shows the switch system for the push-button switch 310 shown in FIG. 20. When push-button switch 310 is depressed, a pulse is applied to flip-flop memory circuit 312 which generates a signal 314. Transistor 316 is turned on in response to the signal and thus allows power to be supplied to electronic calculation circuit 318. This state will continue until the next signal generated from the flip-flop alters the state of the transistor. Accordingly, the power to the calculator is cut off by depressing the push-button switch 310 a second time, whereby flip-flop memory circuit 312 reverses state so as to invert signal 314 and turn transistor 316 off. Indicated at 320 is a battery.

Thus in this modification, a power source is turned on by depressing a push-button and then held in the operative state by means of memory circuit 312 without requiring that the push-button be mechanically restrained. This allows the structure of the push-button switch to be simplified and permits the switch to be readily waterproofed.

Figure 22:
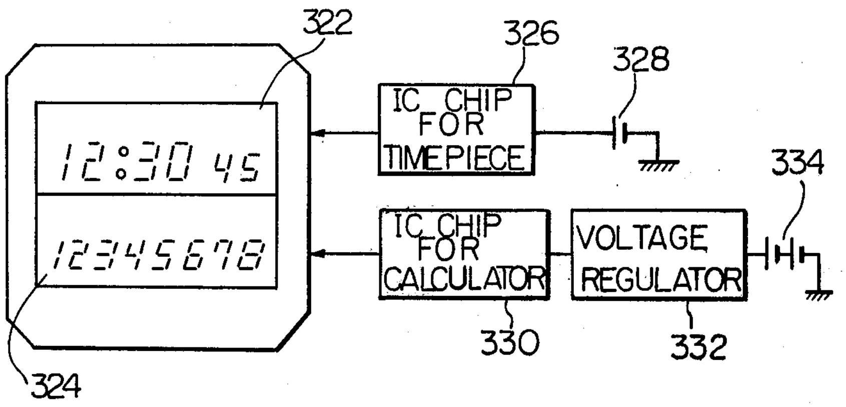
FIG. 22 is a schematic view illustrating a modification of an electronic calculator watch shown in FIG. 3A.

FIG. 22 shows a further modification of the wristwatch in accordance with the present invention. Reference numeral 322 denotes a 1st display section for displaying time, and reference numeral 324 a 2nd display section for displaying calculations. The wristwatch comprises IC 326 for the timepiece which is connected to power source 328 to drive time display 322 in a static manner, and IC 330 for the calculator connected to a power source 334 which is separate from power source 328. IC 330 makes use of a voltage regulator 332 to convert voltages and drive calculator display 324 in a matrix driving mode, and employs a driving voltage which keeps the contrast of the 2nd display section 324 substantially equal to that of the 1st display section 322.

Figure 23:
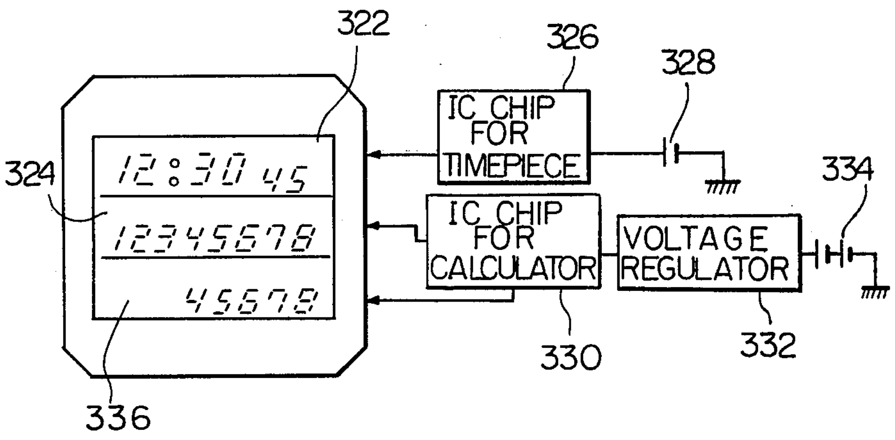
FIG. 23 is a modification of the watch shown in FIG. 22.

FIG. 23 illustrates an embodiment in which the display section is divided into three portions. Here, reference numeral 336 is a 3rd display section for displaying the results of calculations. For example, the results of calculations performed using display section 324 can be transferred to display section 336 so that it is not necessary to record the results on paper for further calculations. Display section 336 may also be employed as an alarm, chronograph, temperature, or pressure display. This embodiment through the utilization of independent IC chips and power sources rather than a single IC chip is extremely advantageous especially in view of mass production and interchangeability.

Figure 24:
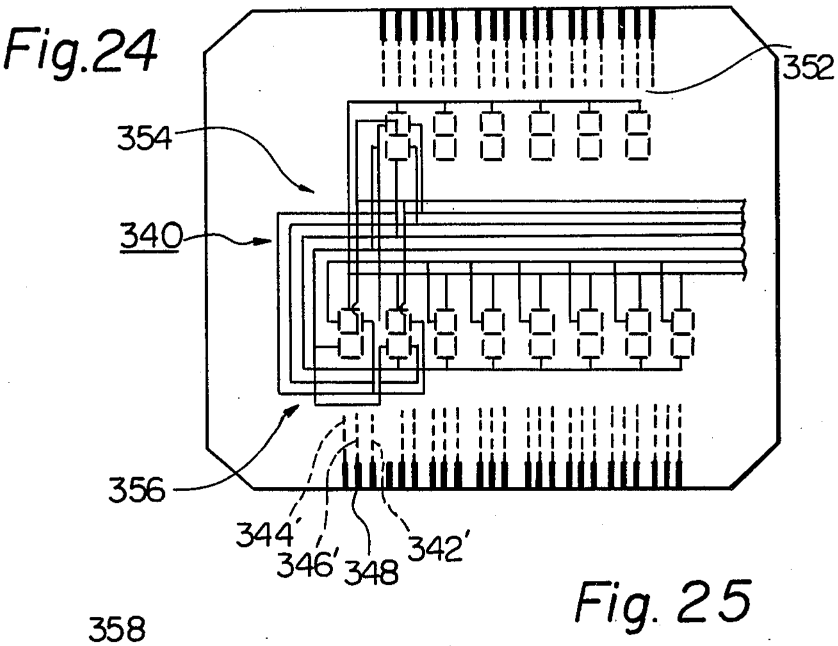
FIG. 24 is a schematic view of circuit connections for the display device shown in FIG. 1.
Figure 25:
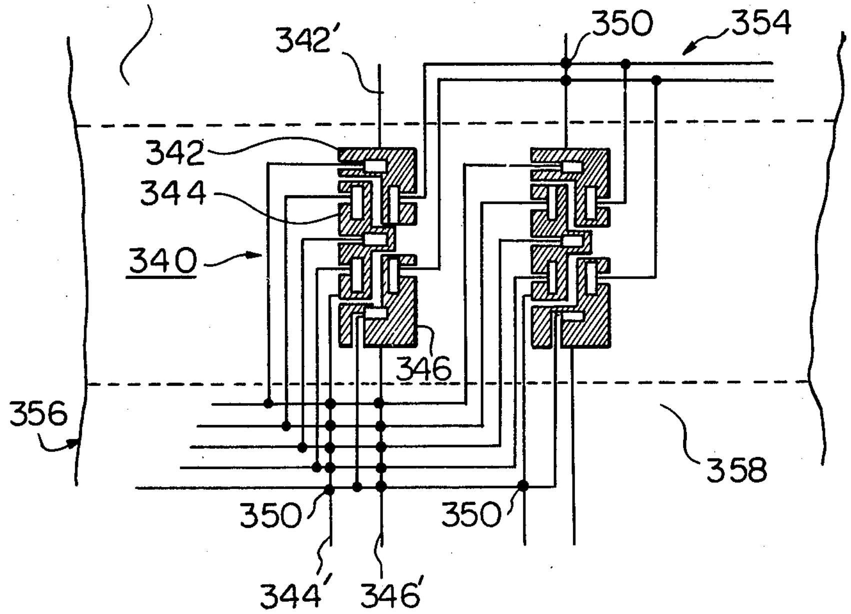
FIG. 25 is an enlarged fragmentary view of a part of the display device shown in FIG. 24.

FIGS. 24 and 25 show a preferred example of circuit connections for display sections of the wristwatch according to the present invention. Here, seven upper electrode lead lines 340 are provided in common for all of the segments, while for each display element comprised of seven segments there are provided three lines 342', 344' and 346' of lower electrodes 342, 344 and 346 used for a driving system employing four power sources. In compact wristwatches which employ small display cells, the fewer the number of connection pins 348, the more stable the time display connections. It is also easier to form the wiring pattern. Because of these merits, a matrix driving system which makes use of fewer pins is more advantageous than a static driving system.

in FIGS. 24 and 25 which show the adaptation of a matrix driving system, the upper electrode lead lines 340 for each segment and the lines 342',344' and 346' of lower electrodes 342,344 and 346 cross at points 350 which are located in the spaces 352, 354, 356 outside of the display segments. These cross points 350 and associated lines are visible on the display and thus pose an inconvenience.

Figure 26:
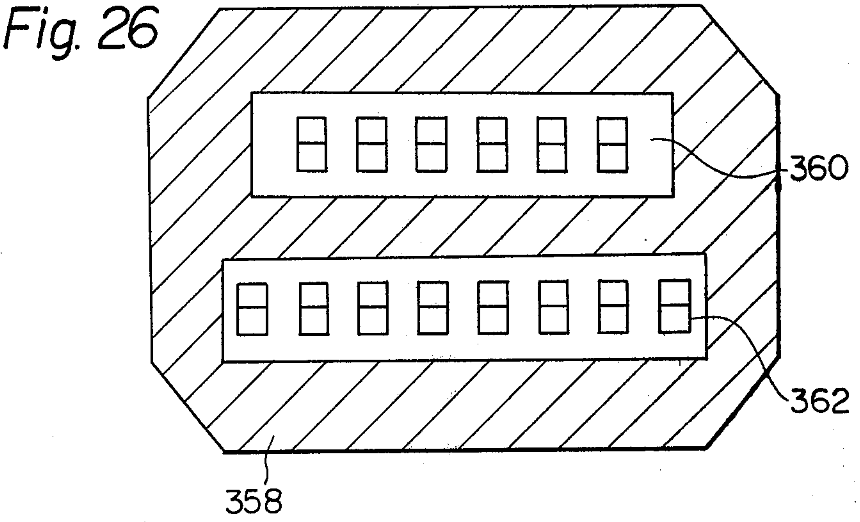
FIG. 26 is a front view of the display device shown in FIGS. 24 and 25.

In accordance with the liquid crystal display device of this illustrated example, the cross points are disposed below the surface of a partitioning shield 358, as illustrated in FIG. 26, which divides the display device into a time display section 360 and a calculator display section 362. This allows the cross points and lines to be concealed from view at all times. An embodiment is also possible in which cross points can be concealed by a wiring arrangement which disposes the cross points along the glass seal of the display cell.

Figure 27:
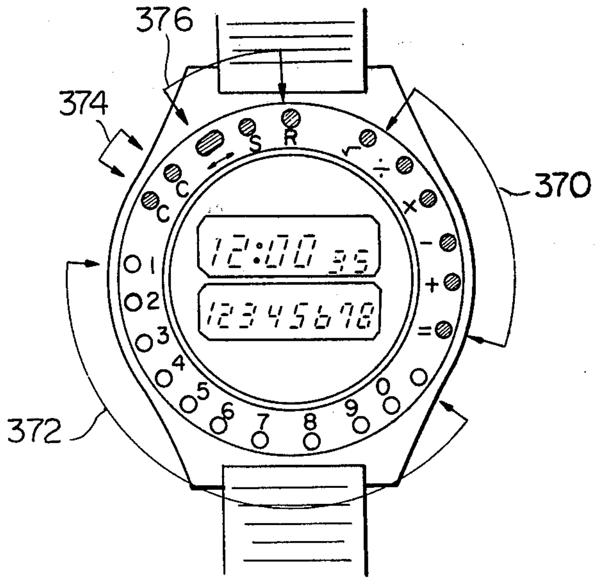
FIGS. 27 to 30 show front views of watches in which keys are classified by color in accordance with their function.

FIG. 27 shows a preferred example of a wristwatch in which keys are classified by jewels' color in accordance with their function in order to make it possible to easily distinguish between them.

In FIG. 27, reference numeral 370 denotes a function key block of which the keys are sapphire, by way of example. Reference numeral 372 designates a numeric key block with its keys composed of ruby, the reference numeral 374 denotes another function key block composed of sapphire as is the block denoted by numeral 370. Reference numeral 376 designates keys for operating the timepiece and for switching purposes. These keys may be composed of diamonds or nephrite. In a modification, the keys may be classified by color without using jewels.

Figure 28:
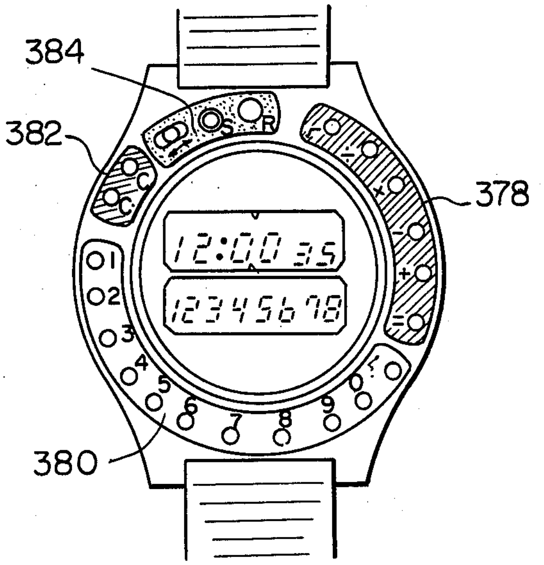

FIG. 28 is another example of the wristwatch in which the keys themselves are all of the same color. Reference numeral 378 denotes a function key block enclosed within a ring which marks off an area that may be colored red, reference numeral 380 denotes a numeric key block encircles by a ring and colored yellow, reference numeral 382 designates a function block encircled by a ring and colored red, and reference numeral 384 designates keys for operating the timepiece and for switching purposes, this group being enclosed within a blue area or the like.

Figure 29:
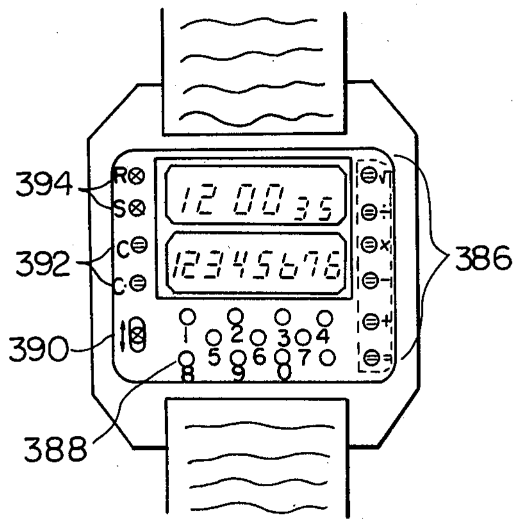

FIG. 29 is still another example of the wristwatch in which the keys are arranged in the form of a matrix on the face of the watch. Reference numeral 386 denotes a function keys which may be colored red, 388 numeric keys in yellow, 390, 394 keys for operating the timekeeping section and colored blue, and 392 function keys colored red.

Figure 30:
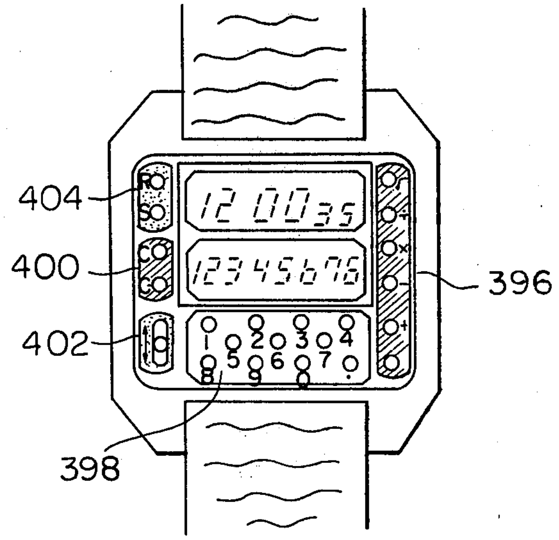

FIG. 30 shows an example in which the keys are all of the same color with the areas surrounding the keys differentiated by means of coloration. For example, function sections 396, 400 are colored red, numeric section 398 is colored yellow, and section 404 for timepiece operation and section 402 for switching are colored blue. According to the foregoing, the present invention makes it extremely easy to distinguish between functions by suitably coloring keys.

Figure 31:
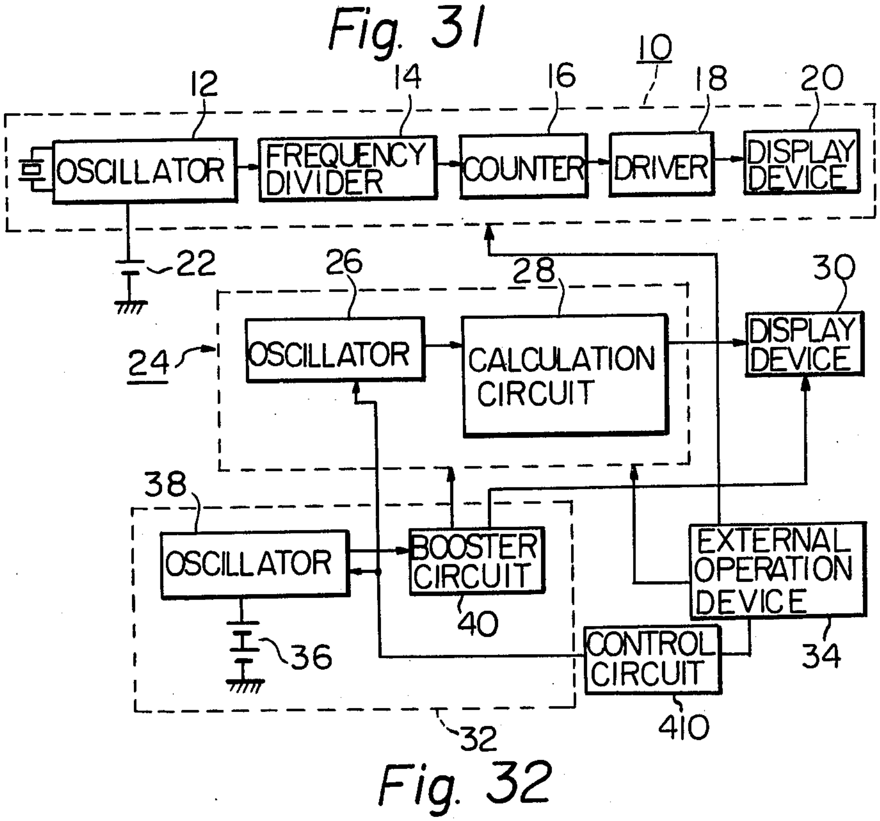
FIG. 31 is a block diagram of another preferred embodiment of an electronic calculator watch according to the present invention.
Figure 32:
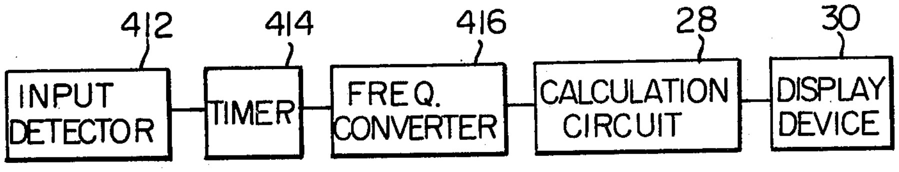
FIG. 32 is a block diagram showing one example of a control circuit shown in FIG. 31.
Figure 33:
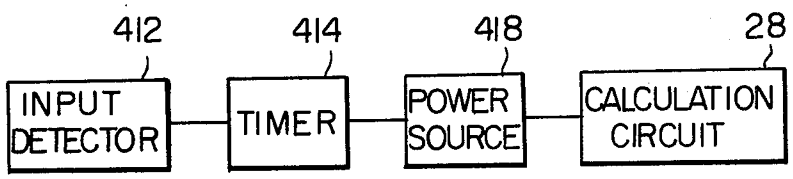
FIG. 33 is a block diagram showing another example of the control circuit shown in FIG. 31.

Another preferred embodiment of a wristwatch according to the present invention is illustrated in FIG. 31, in which like or corresponding components are designated by the same reference numerals as those used in FIG. 1. In this illustrated embodiment, the external operation device 34 is connected to a control circuit 410 which controls the operation of oscillators 26 and 38 in order to reduce the power consumption of the calculator section by as great an amount as possible. FIGS. 32 and 33 illustrate embodiments of this control circuit and show how it is constructed.

FIG. 32 is an embodiment of the control circuit which is made up of a keyboard input detector 412 equipped with a buffer circuit, a timer 414 and a frequency converter 416. The frequency converter is adapted to either change the frequencies obtained from oscillators 26 and 38 or to effect a changeover from a non-oscillatory state to an oscillatory state. In other words, the control circuit detects the fact that the keyboard has been operated and then either causes the oscillator to oscillate for a period determined by the timer or makes a conversion from a low frequency to a high frequency.

FIG. 33 illustrates an embodiment of a system in which a signal from detector 412 indicative of a keyboard input operates timer 414 such that the timer generates a signal which turns on the power source 418 for a period determined by the timer.

Figure 34:
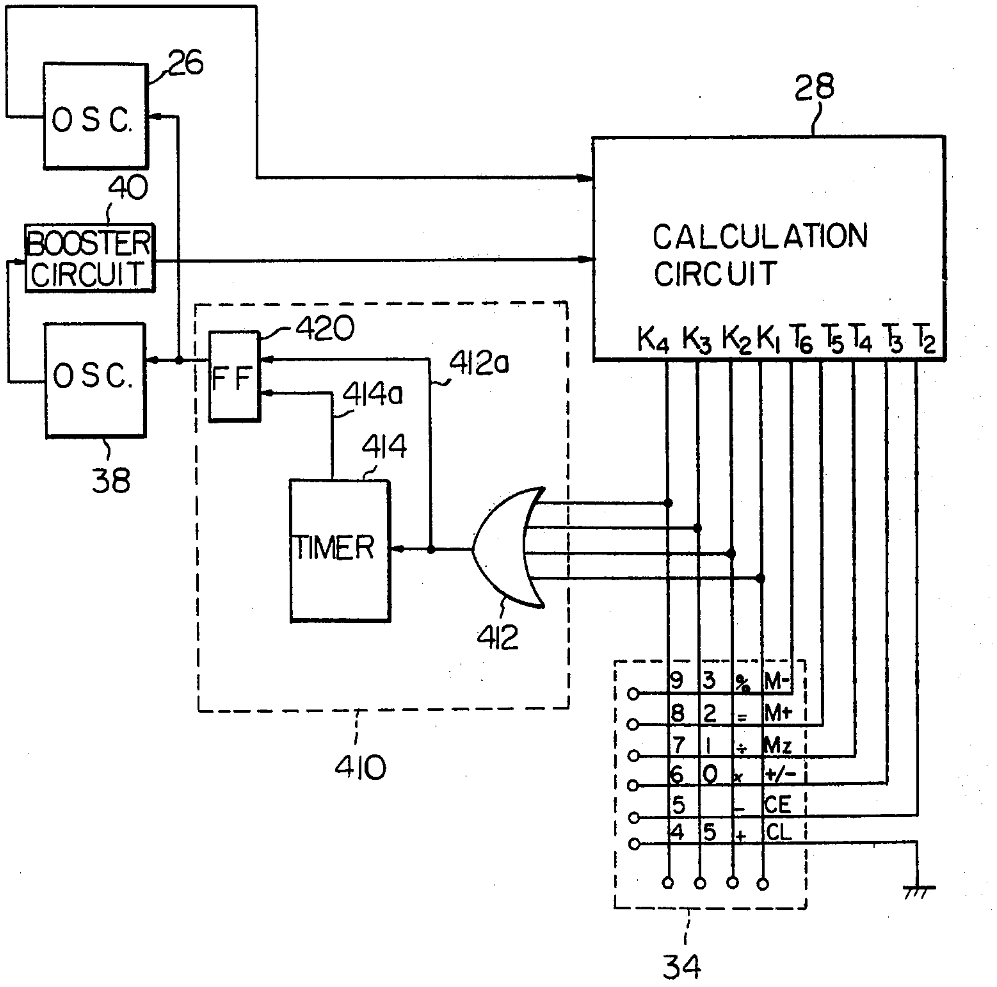
FIG. 34 is a detail circuitry for the control circuit shown in FIG. 32.

FIG. 34 illustrates an embodiment of a circuit which is a slightly more detailed version of the block diagram shown in FIG. 32. Here, a DC level voltage is impressed upon lines K1 to K4 which are a part of keyboard or external operation device 34, while pulsed voltages which differ in phase are impressed upon keyboard lines T2 to T6. Hence, when any key on keyboard 34 is depressed, a clock pulse voltage is impressed upon one of the corresponding lines K1 to K4 so that a clock pulse voltage will always appear at the OR gate of input detector 412 when a key on the keyboard is depressed. This clock pulse is then applied to flip-flop 420 and timer 414. Since the frequency of the clock pulse is normally on the order of 60 Hz, a 30 second to one minute counter may be employed as the timer. The clock pulse from input detector 412 causes flip-flop 420 to change state whereby oscillators 26 and 38 begin oscillating and calculation circuit 28 is brought to an operative state. Once clock pulses from the keyboard cease to be delivered, timer 414 after a prescribed period of time generates a signal which reverses the state of flip-flop 420 whereby oscillators 26 and 38 either stop oscillating or oscillate at a low frequency.

Figure 35:
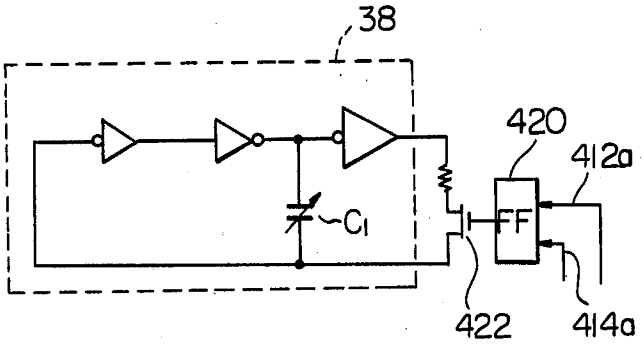
FIG. 35 shows an example in which the oscillator is switched on and off by the control circuit shown in FIG. 32.

FIG. 35 illustrates a case in which the control circuit of the invention is used in oscillator 38. The oscillator can be brought to the oscillatory or non-oscillatory state as determined by the state of transistor 422 which is turned on and off responsive to the output of flip-flop 420.

Figure 36:
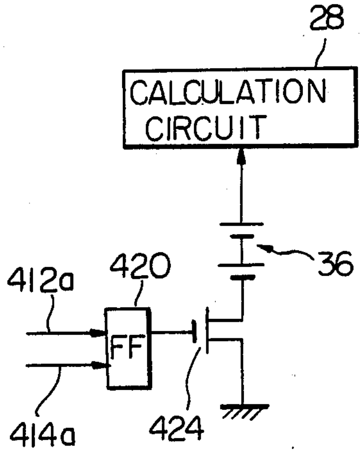
FIG. 36 shows an example in which the supply of power from the power source to a calculator section is controlled by the control circuit shown in FIG. 33.

FIG. 36 shows a case in which the supply of power to the electronic calculator can be terminated responsive to the state of transistor 424 which is turned on and off by output signals 412a obtained from the keyboard and output signals 414a obtained from the timer, these signals being applied across flip-flop 420. Moreover, the use of timer 414 does not permit power to be supplied to the calculator in excess of a predetermined period, a feature which insures that the power source will automatically be removed from the circuit following use even if the power switch is not turned off. This is extremely effective in reducing consumption of the battery.

While the present invention has been shown and described with reference to particular embodiments by way of examples, it should be noted that various other changes or modifications may be made without departing from the scope of the present invention.

What is claimed is:

1. An electronic calculator watch comprising:

timekeeping means composed of an oscillator, a frequency divider connected to the oscillator, a counter circuit connected to the frequency divider, and a driver circuit connected to the counter circuit for providing an output signal indicative of time information;

calculating means composed of an oscillator circuit and a calculation circuit responsive to perform calculations under control of numerical inputs furnished by an external operating device provided on a watch case supported a bezel retaining a watch glass, said bezel having an annular recess and a plurality of circumferentially spaced through-holes, said external operating device comprising a group of push-button switches for operating the timekeeping means and calculating means, said push-button switches being arranged about the outer circumference of the display device, said external operating device further comprising a ring member disposed in said annular recess and having a plurality of circumferentially spaced cylindrical portions pressure fitted into the through-holes of the bezel, each of said cylindrical portions having a stepped bore formed therein to accommodate one of the push-button switches; and a liquid crystal display device including a first display section connected to the driver circuit of the timekeeping means for displaying the output signal delivered therefrom, and a second display section connected to the calculation means for displaying the results of calculations, said first display section having a first set of electrodes formed on a transparent supporting plate of said liquid crystal display device and said second display section having a second set of electrodes formed on said transparent supporting plate, each of said first and second sets of electrodes comprising a plurality of digit electrodes and a plurality of segment electrodes arranged in a matrix configuration;

said timekeeping means and said calculation means being formed on integrated circuit chips which are separated from each other and are connected to independent power sources, said integrated circuit chips being mounted on a circuit board retained between said watch case and a back cover secured thereto, edges of said integrated circuit chips being arranged in said single plane obliquely with respect to each other.

2. An electronic calculator watch according to claim 1, in which said elastomeric member has a plurality of circumferentially spaced tubular portions pressure fitted over the outer peripheries of the cylindrical portions of the ring member, each of the tublar portions having a bottom for resiliently retaining the push-button switch and electrically conductive rubber attached to the back side of the bottom and serving as an electrical contact to interconnect contacts provided on the circuit board when the corresponding push-button is depressed.

3. An electronic calculator watch according to claim 2, and further comprising a ring-shaped holding member having a plurality of circumferentially-spaced holes into which said tubular portions of the elastomeric member are tightly fitted to hold the elastomeric member on the cylindrical portions of the ring member.

4. An electronic calculator watch according to claim 1, and further comprising a partitioning mask plate disposed above and in the same plane as said liquid crystal display device, and in which said liquid crystal display device has first electrode lead wires connected to each segment electrode and second electrode lead wires connected to each digit electrode, the first and second electrode lead wires being arranged so as to cross below a portion of said partitioning mask plate, said partitioning mask plate serving to partition the liquid crystal display device into first and second display sections.

5. An electronic calculator watch according to claim 1, in which said push-button switches comprise keys for the timekeeping function as well as numeric keys and function keys for the calculation function which are classified by color in accordance with their functions.

6. An electronic calculator watch according to claim 5, in which the keys are arranged in circular fashion about the circumference of the watch.

7. An electronic calculator watch according to claim 5, in which the keys are arranged in the form of a matrix on the face of the watch and classified by color in accordance with their function.

8. An electronic calculator watch according to claim 6, in which the keys are classified by jewels in accordance with the functions of the keys.

9. An electronic calculator watch according to claim 1, and further comprising a device cover interposed between the back cover and the circuit board and including a battery seat to support batteries for the timekeeping means and calculating means, the battery seat being integral with the device cover to prevent shocks applied to the battery from being transferred to the circuit board.

10. An electronic calculator watch comprising:

timekeeping means composed of an oscillator, a frequency divider connected to the oscillator, a counter circuit connected to the frequency divider, and a driver circuit connected to the counter circuit for providing an output signal indicative of time information;

calculating means composed of an oscillator circuit and a calculation circuit responsive to perform calculations under control of numerical inputs furnished by an external operating device provided on a watch case, said external operating device comprising a group of push-button switches for operating the timekeeping means and calculating means, said push-button switches being arranged about the outer circumference of the display device, said watch case having a plurality of push-button holes formed about the side surfaces of the watch case to slidably accommodate therein the push-button switches, said external operating device further comprising a ring member having a sleeve portion whereby said ring member is secured to an inner wall of the watch case, said ring member further having a plurality of circumferentially spaced, radially extending elastic tongues to apply pressure to the push-button switches along the axes of the push-button switches in a direction toward the exterior of the watch case, each of said push-button switches being movable toward said circuit board to interconnect electrical contacts mounted thereon when said push-button switch is depressed, said inner wall of the watch case is formed with a cylindrical surface, said external operating device further comprising a pressure fitted ring disposed over said sleeve portion of said ring member, whereby said sleeve portion is held tightly between said cylindrical surface of the watch case and said pressure fitted ring; and a liquid crystal display device including a first display section connected to the driver circuit of the timekeeping means for displaying the output signal delivered therefrom, and a second display section connected to the calculation means for displaying the results of calculations, said first display section having a first set of electrodes formed on a transparent supporting plate of said liquid crystal display device and said second display section having a second set of electrodes formed on said transparent supporting plate, each of said first and second sets of electrodes comprising a plurality of digit electrodes and a plurality of segment electrodes arranged in a matrix configuration;

said timekeeping means and said calculation means being formed on integrated circuit chips which are separated from each other and are connected to independent power sources, said integrated circuit chips being mounted on a circuit board retained between said watch case and a back cover secured thereto, edges of said integrated circuit chips being arranged in said single plane obliquely with respect to each other.

11. An electronic calculator watch according to claim 9, in which each of said elastic tongues is formed with a slit extending in a radial direction, and each of said push-button switches has a projection engaging with one of said slits.

12. An electronic calculator watch comprising:

timekeeping means composed of an oscillator, a frequency divider connected to the oscillator, a counter circuit connected to the frequency divider, and a driver circuit connected to the counter circuit for providing an output signal indicative of time information;

calculating means composed of an oscillator circuit and a calculation circuit responsive to perform calculations under control of numerical input furnished by an external operating device provided on a watch case, said external operating device comprising a group of push-button switches for operating the timekeeping means and calculating means, said push-button switches being arranged about the outer circumference of the display device;

a liquid crystal display device including a first display section connected to the driver circuit of the timekeeping means for displaying the output signal delivered therefrom, and a second display section connected to the calculation means for displaying the results of calculations, said first display section having a first set of electrodes formed on a transparent supporting plate of said liquid crystal display device and said second display section having a second set of electrodes formed on said transparent supporting plate, each of said first and second sets of electrodes comprising a plurality of digit electrodes and a plurality of segment electrodes arranged in a matrix configuration;

ON/OFF switch means comprising a switch spring secured to an inner wall of said watch case and having a fork-shaped spring member with a slot therein, an ON push-button having first and second circumferentially disposed grooves on the periphery thereof, said first groove being held in said slot of said spring member to maintain said ON/OFF switch means in an off condition determined by a first position of said ON push-button, and said second groove being held in said slot of said spring member to maintain said ON/OFF switch means in an on condition determined by a second position of said ON push-button, a transition from said first to said second positions of said ON push-button being effected by depression of said ON push-button whereby the slot in said spring member is forcibly expanded, return spring means coupled to said ON push-button for exerting a force urging said ON push-button in a direction outward from said watch case, an OFF push-button having a tapered portion engaged in said slot of said spring member, whereby depression of said OFF push-button causes expansion of said slot in said spring member thereby causing said ON push-button to return to said first position thereof, and return spring means coupled to said OFF push-button for exerting a force urging said OFF push-button in a direction outward from said watch case;

said timekeeping means and said calculation means being formed on integrated circuit chips which are separated from each other and are connected to independent power sources, said integrated circuit chips being mounted on a circuit board retained between said watch case and a back cover secured thereto, edges of said integrated circuit chips being arranged in said single plane obliquely with respect to each other.

13. An electronic calculator watch comprising:

timekeeping means composed of an oscillator, a frequency divider connected to the oscillator, a counter circuit connected to the frequency divider, and a driver circuit connected to the counter circuit for providing an output signal indicative of time information;

calculation means composed of an oscillator circuit and a calculation circuit responsive to perform calculations under control of numerical inputs furnished by an external operating device provided on a watch case, said external operating device comprising a group of push-button switches;

a liquid crystal display device including a first display section connected to the driver circuit of the timekeeping means for displaying the output signal delivered therefrom, and a second display section connected to the calculation means for displaying the results of calculations, said first display section having a first set of electrodes formed on a transparent supporting plate of said liquid crystal display device and said second display section having a second set of electrodes formed on said transparent supporting plate, each of said first and second sets of electrodes comprising a plurality of digit electrodes and a plurality of segment electrodes arranged in a matrix configuration;

first and second integrated circuit chips forming said timekeeping means and said calculation means respectively, being mounted separately from each other on a circuit board and aligned in a single plane with edges of said integrated circuit chips being arranged in said plane obliquely with respect to each other, said circuit board being retained between the watch case and a back cover secured thereto; and a waterproof structure including a ring-shaped elastomeric member with a peripheral portion thereof sandwiched between said watch case and said circuit board;

with said watch case supporting a bezel which retains a watch glass, said bezel having an annular recess and a plurality of circumferentially spaced through-holes, and further comprising a ring member disposed in said annular recess and having a plurality of circumferentially spaced cylindrical portions pressure fitted into the through-holes of the bezel, each of said cylindrical portions having a stepped bore formed therein to accommodate one of the push-button switches.

14. An electronic calculator watch according to claim 13, in which said elastomeric member includes a plurality of projections cooperating with said push-button switches.

15. An electronic calculator watch according to claim 14, in which said elastomeric member has a plurality of electrical contacts attached to said projections, respectively, said electrical contacts being composed of electrically conductive rubber, and in which said circuit board is provided with a through-hole for an electrical conductor and for preventing an air-tight condition.

16. An electronic calculator watch according to claim 13, in which said elastomeric member has a plurality of circumferentially spaced tubular portions pressure fitted over the outer peripheries of the cylindrical portions of the ring member, each of the tubular portions having a bottom for resiliently retaining the push-button switch and an electrically conductive rubber member attached to the back side of the bottom and serving as an electrical contact to interconnect contacts provided on the circuit board when the corresponding pushbutton switch is depressed.

17. An electronic calculator watch according to claim 16, and further comprising a ring-shaped holding member having a plurality of circumferentially spaced holes into which said tubular portions of the elastomeric member are tightly fitted to hold the elastomeric member tightly on the cylindrical portions of the ring member.

18. An electronic calculator watch according to claim 13, in which a push-button switch for time correction is provided with a collar which is flush with the head of said push-button switch and projects from said watch case, for preventing accidental operation of said push-button switch for time correction.

19. An electronic calculator watch according to claim 13, and further comprising ON/OFF switch means having:

a switch spring secured to an inner wall of said watch case and having a fork-shaped spring member with a slot therein;

an ON push-button having first and second circumferentially disposed grooves on the periphery thereof, said first groove being held in said slot of the spring member to maintain said ON/OFF switch means in an off condition determined by a first position of said ON push-button, and said second groove being held in said slot of said spring member to maintain said ON/OFF switch in an ON condition determined by a second position of said ON push-button, a transition from said first to said second position of said ON push-button being effected by depression of said ON push-button whereby said slot in the spring member is forcibly expanded;

return spring means coupled to said ON push-button for exerting a force urging said ON push-button in a direction outward from said watch case;

and OFF push-button having a tapered portion engaged with said slot in the spring member, whereby depression of said OFF push-button causes expansion of said slot in said spring member thereby causing said ON push-button to return to said first position thereof; and return spring means coupled to said OFF push-button for exerting a force urging said OFF push-button in a direction outward from said watch case.

20. An electronic calculator watch according to claim 13, and further comprising a partitioning mask plate disposed above and in the same plane as said liquid crystal display device, and in which said liquid crystal display device has first electrode lead wires connected to each segment electrode and second electrode lead wires connected to each digit electrode, the first and second electrode lead wires being arranged so as to cross below a portion of said partitioning mask plate, said partitioning mask plate serving to partition the liquid crystal display device into first and second display sections.

21. An electronic calculator watch according to claim 17, in which the push-button switches comprise keys for the timekeeping functions as well as numeric keys and function keys for the calculation functions, which are classified by color in accordance with their functions.

22. An electronic calculator watch according to claim 21, in which the keys are arranged in circular fashion about the circumference of the watch.

23. An electronic calculator watch according to claim 22, in which the keys are colored identically, the areas on the outer surface of the watch case adjacent to the keys being classified by color in accordance with the functions of the keys adjacent thereto.

24. An electronic calculator watch according to claim 22, in which characters which indicate the functions of the keys are classified by color in accordance with the functions so indicated.

25. An electronic calculator watch according to claim 21, in which the keys are arranged in the form of a matrix on the face of the watch and classified by color in accordance with their functions.

26. An electronic calculator watch according to claim 22, in which the keys are classified by jewels in accordance with their functions.

27. An electronic calculator watch according to claim 23, and further comprising a device cover interposed between the back cover and the circuit board and including a battery seat to support batteries for the timekeeping means and calculating means, the battery seat being integral with the device cover to prevent shocks applied to the battery from being applied to the circuit board.

28. An electronic calculator watch comprising:

timekeeping means composed of an oscillator, a frequency divider connected to the oscillator, a counter circuit connected to the frequency divider, and a driver circuit connected to the counter circuit for providing an output signal indicative of time information;

calculation means composed of an oscillator circuit and a calculation circuit responsive to perform calculations under control of numerical inputs furnished by an external operating device furnished on a watch case, said external device comprising a group of push-button switches, the watch case having a plurality of push-button holes formed about the side surfaces of the watch case to slidably accommodate therein the push-button switches, said external operating device further comprising a ring member having a sleeve portion and a pressure fitted ring disposed over said sleeve portion whereby said sleeve portion is held tightly between a cylindrical surface of the watch case and said pressure fitted ring, said ring member further having a plurality of circumferentially spaced, radially extending elastic tongues to apply pressure to the push-button switches along the axes of the push-button switches in a direction toward the exterior of the watch case, said electronic timepiece further comprising a circuit board, and each of said push-button switches being movable toward said circuit board to interconnect electrical contacts mounted thereon when said push-button switch is depressed;

a liquid crystal display device including a first display section connected to the driver circuit of the timekeeping means for displaying the output signal delivered therfrom, and a second display section connected to the calculation means for displaying the results of calculations, said first display section having a first set of electrodes formed on a transparent supporting plate of said liquid crystal display device and said second display section having a second set of electrodes formed on said transparent supporting plate, each of said first and second sets of electrodes comprising a plurality of digit electrodes and a plurality of segment electrodes arranged in a matrix configuration; and first and second integrated circuit chips forming said timekeeping means and said calculation means respectively, being mounted separately from each other on said circuit board and aligned in a single plane with edges of said integrated circuit chips being arranged in said plane obliquely with respect to each other, said circuit board being retained between the watch case and a back cover secured thereto.

29. An electronic calculator watch according to claim 28, in which each of said elastic tongues is formed with a slit extending in a radial direction, and each of said push-button switches has a projection engaging with one of said slits.

30. An electronic calculator watch according to claim 28, in which a push-button switch for time correction is provided with a collar which is flush with the head of said push-button switch and projects from the watch case, for preventing accidental operation of said push-button switch for time correction.

31. An electronic calculator watch according to claim 28, and further comprising ON/OFF switch means having:

a switch spring secured to an inner wall of said watch case and having a fork-shaped spring member with a slot therein;

an ON push-button having first and second circumferentially disposed grooves on the periphery thereof, said first groove being held in said slot of the spring member to maintain said ON/OFF switch means in an off condition determined by a first position of said ON push-button, and said second groove being held in said slot of said spring member to maintain said ON/OFF switch means in an on condition determined by a second position of said ON push-button, a transition from said first to said second positions of said ON push-button being effected by depression of said ON push-button whereby the slot in said spring member is forcibly expanded;

return spring means coupled to said ON push-button for exerting a force urging said ON push-button in a direction outward from the watch case;

an OFF push-button having a tapered portion engaged in said slot of the spring member, whereby depression of said OFF push-button causes expansion of the slot in said spring member thereby causing said ON push-button to return to said first position thereof; and return spring means coupled to said OFF push-button for exerting a force urging said OFF push-button in a direction outward from the watch case.

32. An electronic calculator watch according to claim 28, and further comprising a partitioning mask plate disposed above and in the same plane as said liquid crystal display device, and in which said liquid crystal display device has first electrode lead wires connected to each segment electrode and second electrode lead wires connected to each digit electrode, the first and second electrode lead wires being arranged so as to cross below a portion of said partitioning mask plate, said partitioning mask plate serving to partition the liquid crystal display device into first and second display sections.

33. An electronic calculator watch according to claim 28, in which said push-button switches comprise keys for the timekeeping function as well as numeric keys and function keys for the calculation function, which are classified by color in accordance with their functions.

34. An electronic calculator watch according to claim 23, in which said keys are arranged in circular fashion about the circumference of the watch.

35. An electronic calculator watch according to claim 34, in which the keys are colored identically, areas on the outer surface of the watch case adjacent to the keys being classified by color in accordance with the functions of the keys adjacent thereto.

36. An electronic calculator watch according to claim 34, in which characters which indicate the functions of the keys are classified by color in accordance with the functions so indicated.

37. An electronic calculator watch according to claim 33, in which the keys are arranged in the form of a matrix on the face of the watch and classified by color in accordance with their functions.

38. An electronic calculator watch according to claim 34, in which the keys are classified by jewels in accordance with their functions.

39. An electronic calculator watch according to claim 28, and further comprising a device cover interposed between the back cover and the circuit board and including a battery seat to support batteries for the timekeeping means and calculation means, the battery seat being integral with the device cover to prevent shocks applied to the battery from being transferred to the circuit board.

* * * * *